United States Patent
Nakamoto

(10) Patent No.: US 8,966,469 B2
(45) Date of Patent: Feb. 24, 2015

(54) APPARATUS, METHOD AND STORAGE MEDIUM FOR DETERMINING VERSIONS AND UPDATING SOFTWARE

(75) Inventor: Hisashi Nakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1349 days.

(21) Appl. No.: 12/357,227

(22) Filed: Jan. 21, 2009

(65) Prior Publication Data

US 2009/0187900 A1 Jul. 23, 2009

(30) Foreign Application Priority Data

Jan. 22, 2008 (JP) .................................. 2008-011929

(51) Int. Cl.
G06F 9/44 (2006.01)
G06F 9/445 (2006.01)

(52) U.S. Cl.
CPC ........................................ *G06F 8/65* (2013.01)
USPC .......................................... 717/170; 717/169

(58) Field of Classification Search
CPC ............. G06F 8/65; G06F 8/66; G06F 8/665; G06F 8/67; G06F 8/68; G06F 11/1446; G06F 11/1448; G06F 11/1451; G06F 11/1453; G06F 11/1458; G06F 11/1464; G06F 11/1469
USPC ......... 717/101–178; 358/1.14, 1.15; 719/327; 714/5.1; 703/27; 710/4, 8, 10; 709/206, 709/220, 221
See application file for complete search history.

(56) References Cited

U.S. PATENT DOCUMENTS

| | | | | |
|---|---|---|---|---|
| 5,835,953 A | * | 11/1998 | Ohran | 711/162 |
| 6,615,166 B1 | * | 9/2003 | Guheen et al. | 703/27 |
| 6,915,514 B1 | * | 7/2005 | Machida | 717/174 |
| 7,065,770 B2 | * | 6/2006 | Nomura et al. | 719/327 |
| 7,073,017 B2 | * | 7/2006 | Yamamoto | 711/103 |
| 7,676,479 B2 | * | 3/2010 | Meller et al. | 707/695 |
| 7,694,088 B1 | * | 4/2010 | Bromley et al. | 711/162 |
| 8,065,672 B2 | * | 11/2011 | Sriram et al. | 717/169 |

(Continued)

FOREIGN PATENT DOCUMENTS

| | | |
|---|---|---|
| EP | 1003099 | 5/2000 |
| JP | 2001-067228 A | 3/2001 |

(Continued)

OTHER PUBLICATIONS

Japanese Office Action dated Jun. 22, 2012 for JP 2008-011929.

*Primary Examiner* — Lewis A Bullock, Jr.
*Assistant Examiner* — Francisco Aponte
(74) *Attorney, Agent, or Firm* — Carter, DeLuca, Farrell & Schmidt, LLP

(57) ABSTRACT

An information processing apparatus includes a storage unit configured to store a list which makes the version of software correspond to mapping information, a first determination unit configured to, when updating the version of the software, determine by referring to the list, whether mapping information corresponding to a version before update is different from that corresponding to a version after update, a recognition unit configured to, when the first determination unit determines that these pieces of mapping information are different from each other, recognize a different mapping information item as information to be backed up, and an update unit configured to update the version of the software when the first determination unit determines that these pieces of mapping information coincide with each other.

13 Claims, 21 Drawing Sheets

(56) References Cited

U.S. PATENT DOCUMENTS

| | | | |
|---|---|---|---|
| 8,156,071 B2 * | 4/2012 | Gu et al. | 341/50 |
| 2002/0067504 A1 * | 6/2002 | Salgado et al. | 358/1.15 |
| 2002/0073304 A1 * | 6/2002 | Marsh et al. | 713/1 |
| 2003/0041127 A1 * | 2/2003 | Turnbull | 709/220 |
| 2003/0145315 A1 * | 7/2003 | Aro et al. | 717/170 |
| 2003/0208750 A1 * | 11/2003 | Tapper et al. | 717/177 |
| 2003/0231333 A1 * | 12/2003 | Nakamura et al. | 358/1.14 |
| 2004/0045012 A1 * | 3/2004 | Doraisamy | 719/321 |
| 2005/0114620 A1 | 5/2005 | Justen | |
| 2005/0132091 A1 * | 6/2005 | Shibata | 710/4 |
| 2006/0075284 A1 * | 4/2006 | Skan | 714/5 |
| 2006/0136903 A1 * | 6/2006 | Childress et al. | 717/172 |
| 2007/0006208 A1 * | 1/2007 | Nguyen et al. | 717/168 |
| 2007/0055969 A1 * | 3/2007 | Yang | 717/168 |
| 2008/0109800 A1 * | 5/2008 | Takahashi et al. | 717/170 |
| 2008/0134165 A1 * | 6/2008 | Anderson et al. | 717/173 |

FOREIGN PATENT DOCUMENTS

| | | |
|---|---|---|
| JP | 2003-111112 A | 4/2003 |
| JP | 2003-256228 A | 9/2003 |
| JP | 2006-277225 A | 10/2006 |
| WO | 98/03909 | 1/1998 |

* cited by examiner

F I G. 4
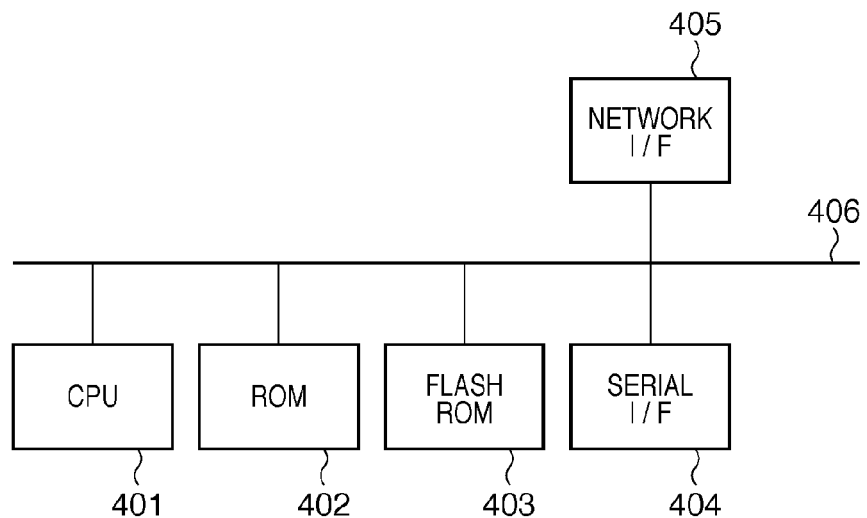
F I G. 5
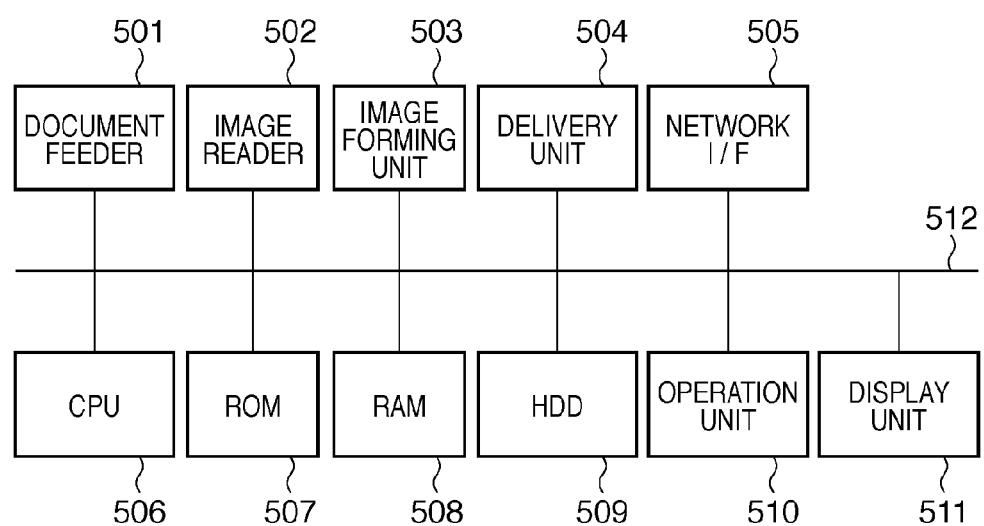

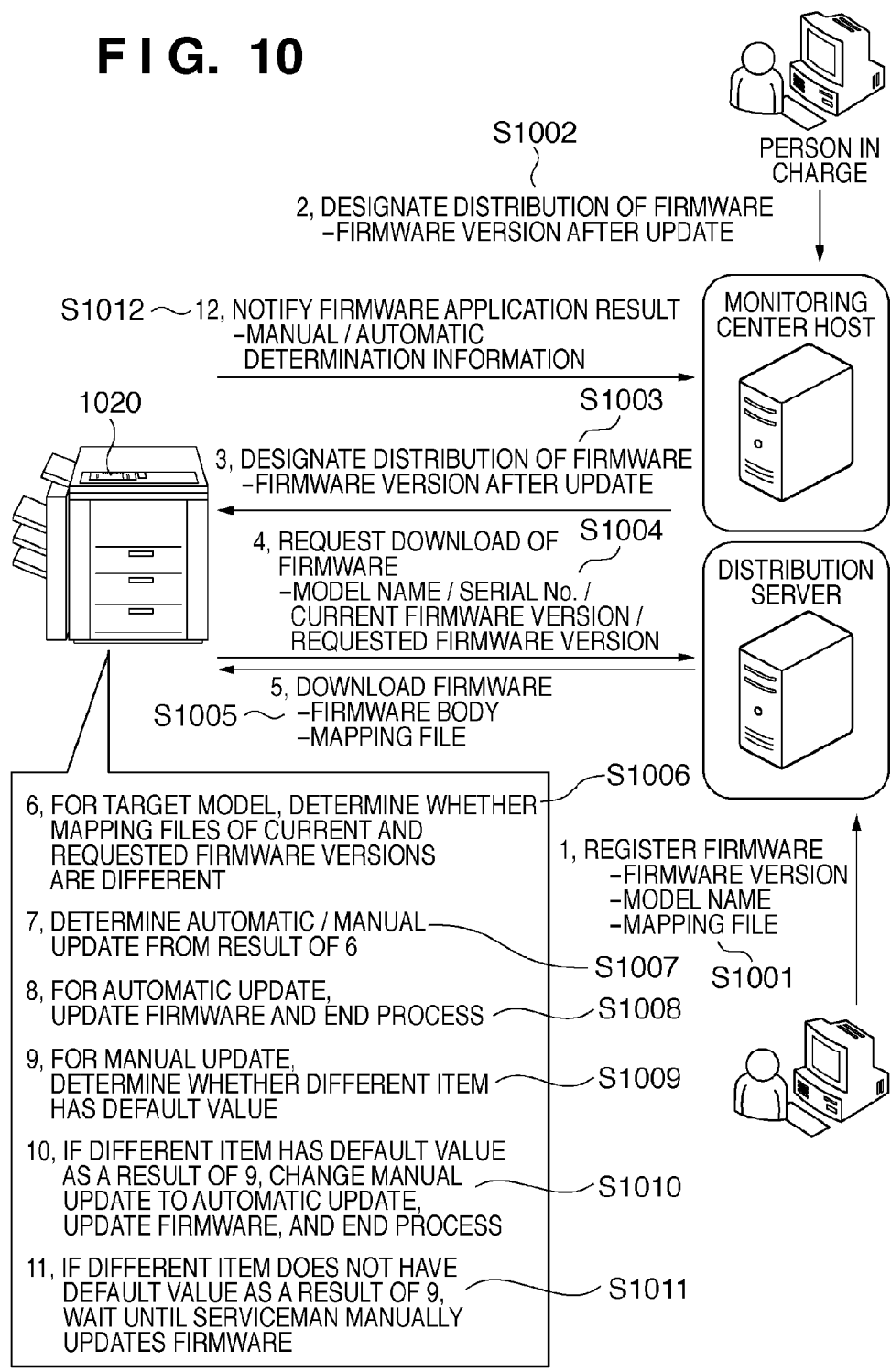

FIG. 11

| 1101<br>ITEM | 1102<br>ITEM | 1103<br>ITEM |
|---|---|---|
| MODEL NAME | FIRMWARE VERSION | MAPPING FILE |
| ABCD | 1.0 | <NONVOLATILE MEMORY><br>  0x0021 : DESTINATION TABLE<br>  0x0032 : BOX INFORMATION<br>  0x0055 : SERVICE MODE INFORMATION<br><HARD DISK><br>  0x0062 : COUNTER INFORMATION<br>    : |
| ABCD | 1.1 | <NONVOLATILE MEMORY><br>  0x0021 : DESTINATION TABLE<br>  0x0042 : BOX INFORMATION<br>  0x0053 : SERVICE MODE INFORMATION<br><HARD DISK><br>  0x0062 : COUNTER INFORMATION<br>    : |
| ABCD | 1.2 | <NONVOLATILE MEMORY><br>  0x0021 : DESTINATION TABLE<br>  0x0032 : BOX INFORMATION<br>  0x0055 : SERVICE MODE INFORMATION<br><HARD DISK><br>  0x0062 : COUNTER INFORMATION<br>    : |
| ABCD | 1.3 | <NONVOLATILE MEMORY><br>  0x0033 : DESTINATION TABLE<br>  0x0045 : BOX INFORMATION<br>  0x0055 : SERVICE MODE INFORMATION<br><HARD DISK><br>  0x0083 : COUNTER INFORMATION<br>    : |
| : | : | : |

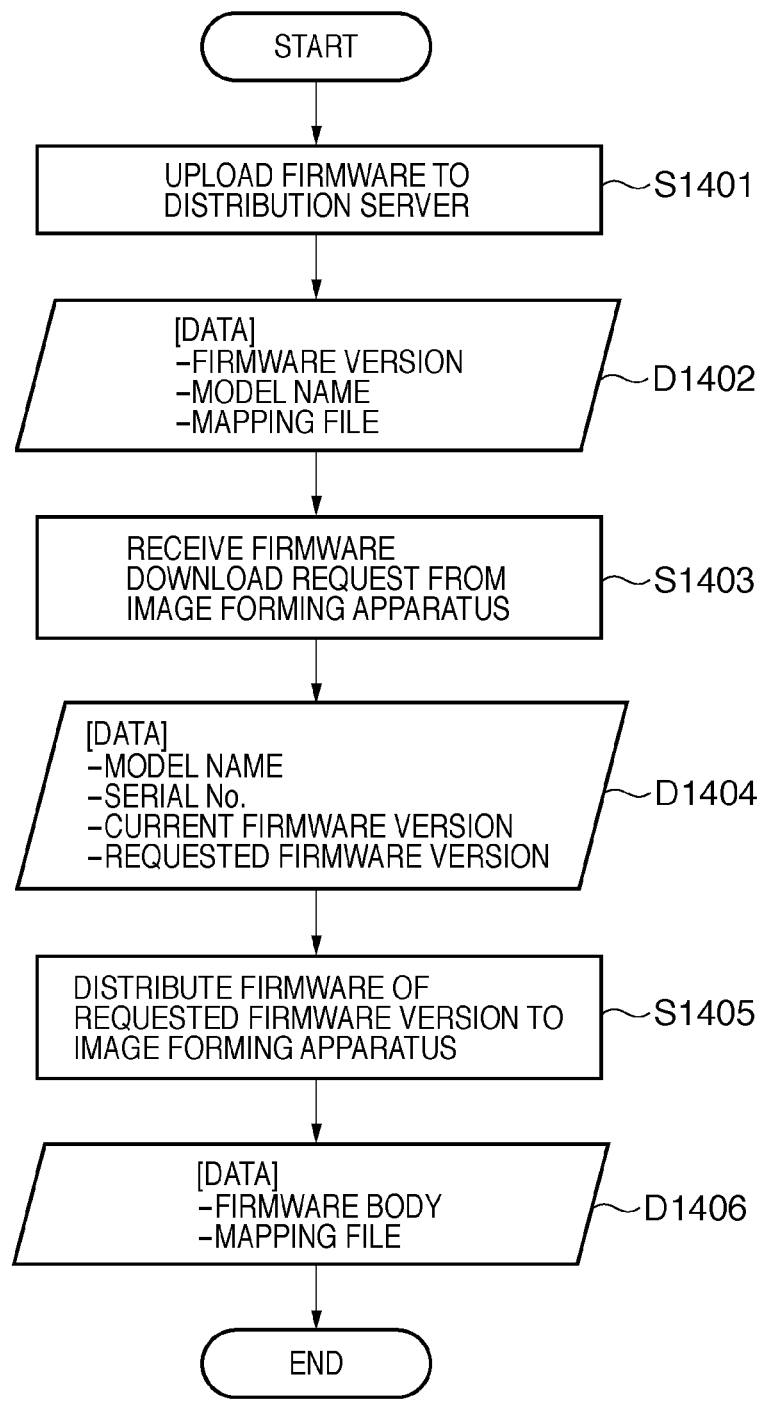

FIG. 17A

DISTRIBUTION OF FIRMWARE

SALES ORGANIZATION NAME : XXX SALES COMPANY ▶

From (dd-mm-yyyy) : 05-11-2007 ☐   To (dd-mm-yyyy) : 05-11-2007 ☐

CUSTOMER NAME : ALL ▶   CUSTOMER ID : ALL ▶

MONITORING APPARATUS ID : -SELECT- ▶   DEVICE ID : -SELECT- ▶

PRODUCT NAME : -SELECT- ▶   OVERALL FIRMWARE VERSION : -SELECT- ▶

☑ VIP   ☑ NORMAL

NUMBER OF RECORDS TO DISPLAY 10    SEARCH    RESET    SAVE CONDITIONS

1701

F I G. 17B

| DISTRI-BUTION TARGET | PEND-ING | LATEST UPDATE DATE & TIME | CUS-TOMER NAME | CUS-TOMER ID | CON-TRACT TYPE | MON-ITOR-ING APPARAT-US ID | DE-VICE ID | DE-VICE NAME | OVER-ALL FIRM-WARE-VERSION | LAT-EST | EX-PECTED DISTRI-BUTION DATE & TIME | DISTRI-BUTION STATUS | DETAILS |
|---|---|---|---|---|---|---|---|---|---|---|---|---|---|
| ☐ | ☐ | 2007-03-05 21:51 (+09:00) | A-Systems | A-0001 | VIP | AAA-3896X | XXX-XXX | abcd | 11.93 | yes | N/A | ⊗ | DETAILS |
| ☒ | ☒ | 2006-12-21 16:48 (+09:00) | A-Systems | A-0001 | VIP | AAA-3896X | XXX-XXX | ABCD | 10.91 | no | 2007-11-23 23:15 | ⊘ | DETAILS |
| ☐ | ☐ | 2007-03-05 21:51 (+09:00) | A-Systems | A-0001 | VIP | AAA-3896X | XXX-XXX | abcd | 10.21 | yes | N/A | ⊗ | DETAILS |
| ☒ | ☒ | 2006-12-21 16:48 (+09:00) | A-Systems | A-0001 | VIP | AAA-3896X | XXX-XXX | ABCD | 10.91 | no | 2007-11-23 23:15 | ⊘ | DETAILS |

1702

☒ SELECT ALL DETECTED DEVICES

▼ PREVIOUS    NEXT ▲

FIG. 17C

1703 — FIRMWARE UPDATE
AUTHENTIC UPGRADE    INDIVIDUAL UPGRADE    CRITICAL PATCH

1704 — OVERALL FIRMWARE VERSION
ABCD – Ver. 11.00 ▶

DESIGNATE FIRMWARE DISTRIBUTION DATES & TIMES(DESIGNATE PERIOD)

1705 —
DISTRIBUTION START DATE (yyyy-mm-dd): 2007-11-23 ☐    DISTRIBUTION START TIME (hh-mm-ss): 23-15-00 ☐
DISTRIBUTION END DATE (yyyy-mm-dd): 2007-11-24 ☐    DISTRIBUTION END TIME (hh-mm-ss): 05-15-00 ☐

APPLY DISTRIBUTION DATES & TIMES

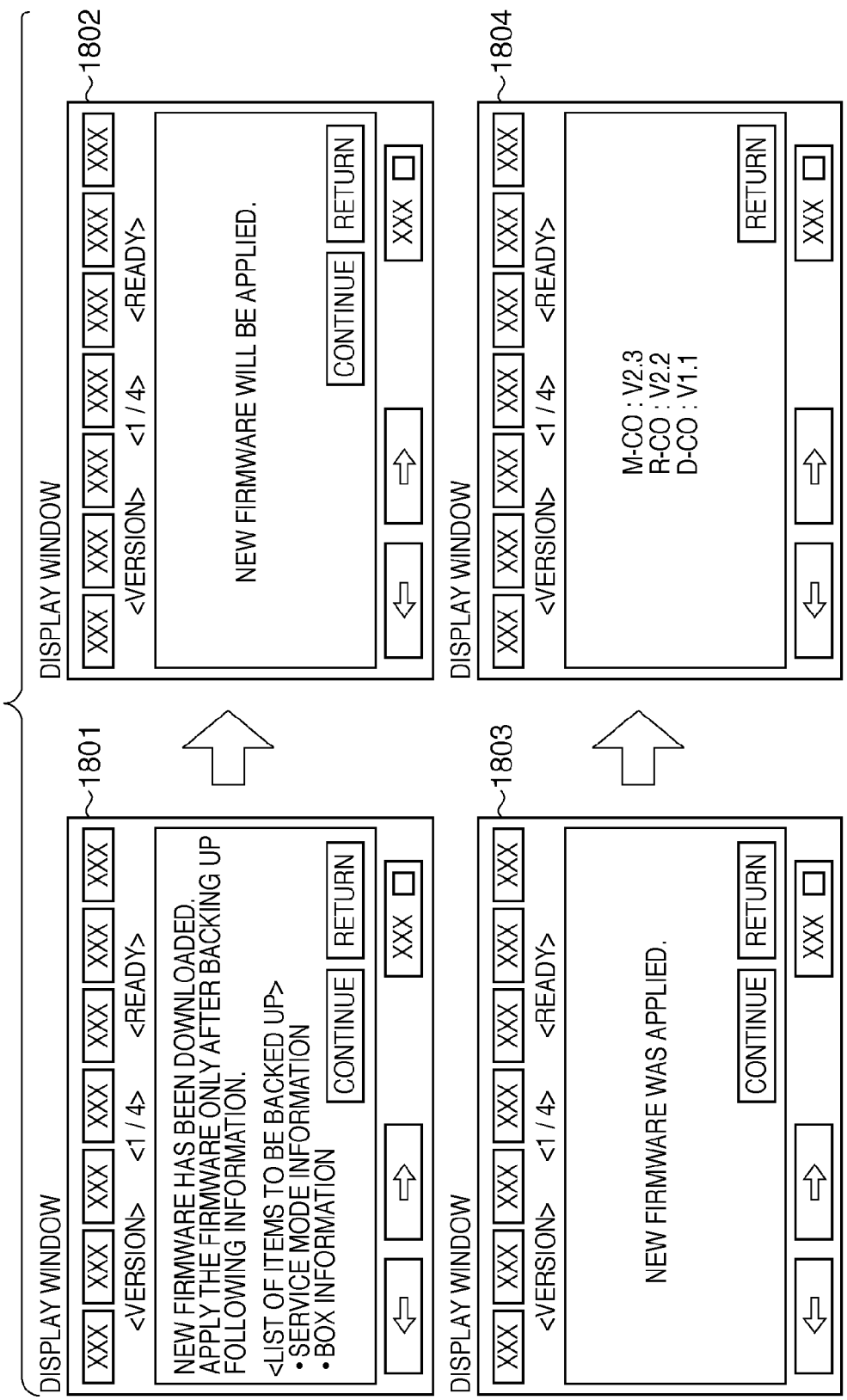

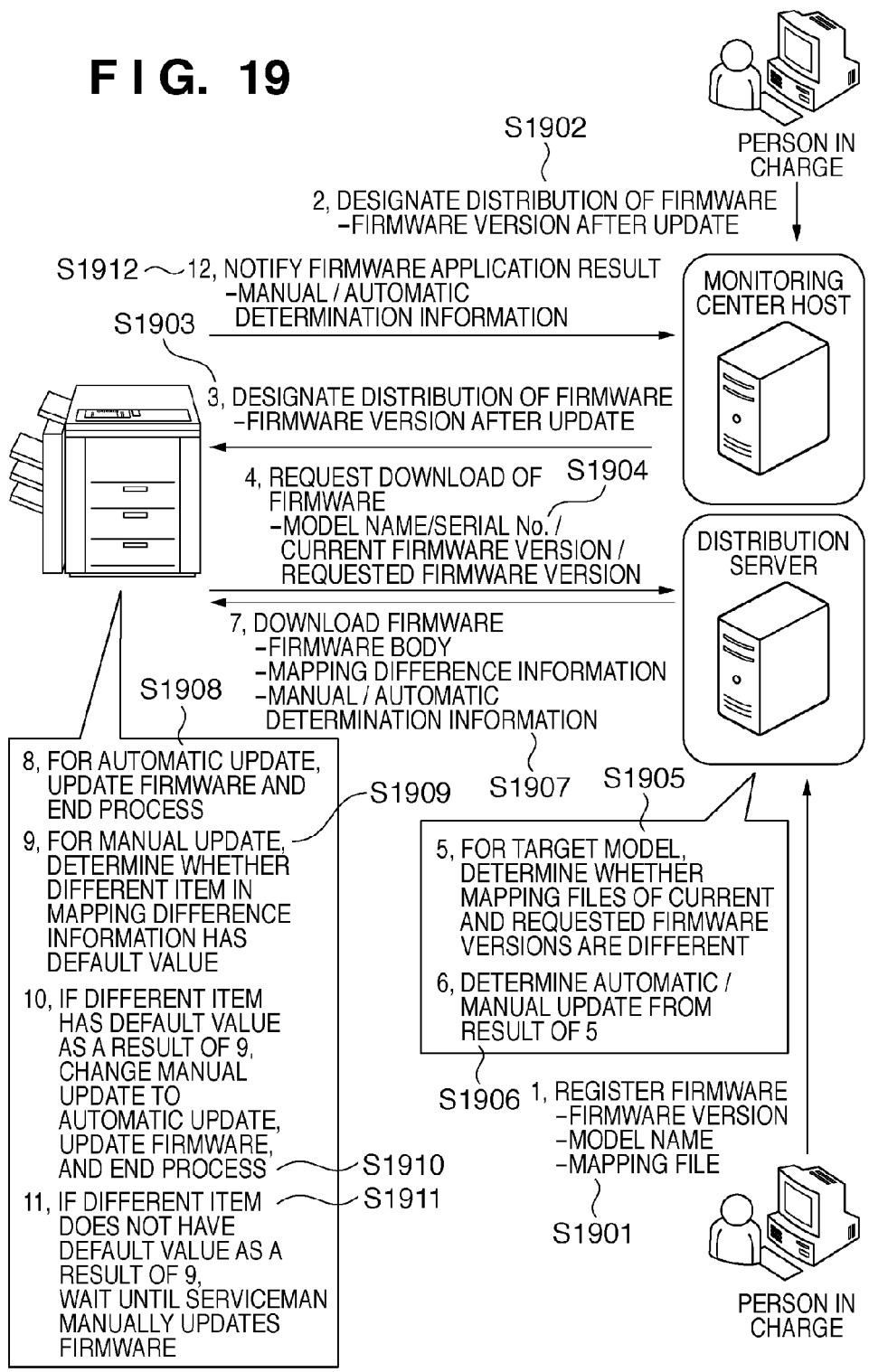

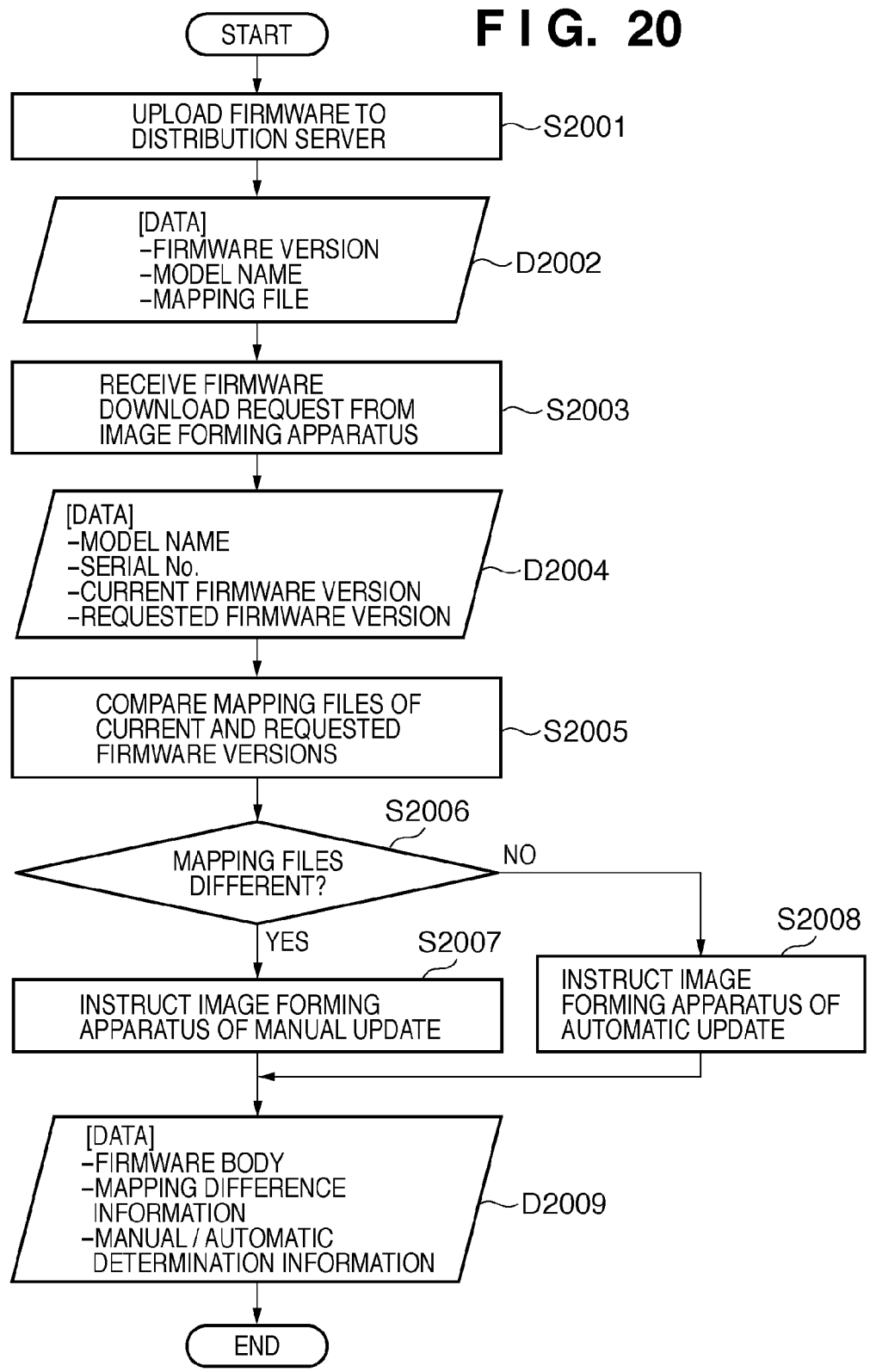

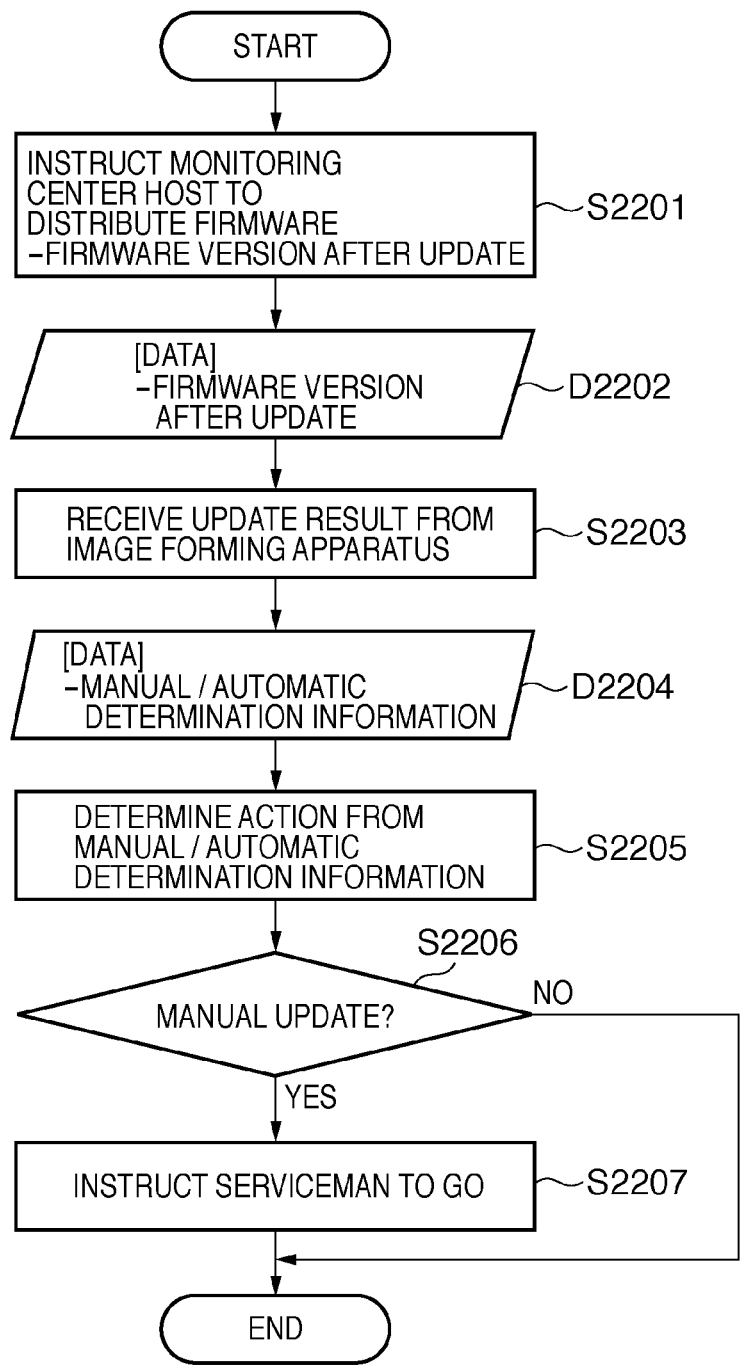

APPARATUS, METHOD AND STORAGE MEDIUM FOR DETERMINING VERSIONS AND UPDATING SOFTWARE

BACKGROUND OF THE INVENTION

1. Field of the Invention

The present invention relates to an information processing, more specifically, an apparatus which updates the version of software, system, method and storage medium storing program thereof.

2. Description of the Related Art

A system which remotely manages the operating state of the peripheral device of an information processing apparatus has been widely used. A system which uses an image forming apparatus as an information processing apparatus updates the firmware of the image forming apparatus as follows. When firmware needs to be upgraded, or updated owing to any reason such as a fault, a serviceman visits a customer and manually updates the firmware. For example, all firmware modules must be stored in the ROM of a printer. To update the firmware, the serviceman must do special work to exchange the ROM or rewrite a built-in flash memory or EEPROM. This raises the cost to update firmware. To solve this problem, it has become popular recently to update firmware by storing it in a rewritable storage device such as a flash memory and distributing it via the Internet by using e-mail or the like.

A function of distributing firmware, an application, or the like to an image forming apparatus, and remotely upgrading the firmware of the image forming apparatus is known as one function of a distribution server. Current image forming apparatuses use a nonvolatile memory for holding operation settings and the like in the firmware of the image forming apparatus. When storing operation settings and the like in the nonvolatile memory, an area used for each of firmware modules of the image forming apparatus is generally assigned as a memory map in advance. In accordance with the memory map, operation settings and the like are read out/written from/in the area of each firmware of the image forming apparatus.

When firmware of the image forming apparatus is upgraded, the memory map of the nonvolatile memory sometimes changes upon addition/deletion of the configuration firmware or a change of specifications. In general, when activating upgraded firmware, the nonvolatile memory is automatically initialized to safely activate it. In this case, however, operation settings and the like held in the nonvolatile memory are also initialized, so the address book, user mode/service mode settings, and job information are also initialized. Conventionally, mapping information which is held in the memory and represents the addresses of operation settings and the like is not particularly associated with the version of firmware. Hence, at the site, the serviceman checks address information of operation settings and the like immediately before upgrading, and temporarily saves it outside the image forming apparatus. After upgrading, the serviceman writes back the saved settings, thereby preventing the above-mentioned initialization of operation settings and the like.

Conventionally, the serviceman determines whether it is necessary to save operation setting information and the like in the nonvolatile memory. It is highly likely that the serviceman erroneously initializes operation settings owing to a determination error, or always performs unnecessary save work for safety. A new technique is required to safely achieve upgrading without performing field work as much as possible.

Japanese Patent Laid-Open No. 2001-67228 discloses a download method of holding some or all firmware modules of a printer in a host PC. According to this method, every time print processing is done, the printer driver compares the state of firmware running in the printer with firmware requested by an application, and downloads only necessary modules to the printer. However, Japanese Patent Laid-Open No. 2001-67228 does not particularly describe an improvement of convenience for saving operation setting information and the like when updating firmware.

SUMMARY OF THE INVENTION

The present invention provides an information processing apparatus which automatically determines the necessity to back up operation setting information, thereby improving the convenience of updating the version of software.

The present invention in a first aspect provides an information processing apparatus which updates a version of software stored inside or outside the information processing apparatus, the apparatus including a storage unit configured to store a list which makes a version of the software correspond to mapping information representing a data storage position in the information processing apparatus, a first determination unit configured to, when updating the version of the software, determine, by referring to the list stored in the storage unit, whether mapping information corresponding to a version before update is different from mapping information corresponding to a version after update, a recognition unit configured to, when the first determination unit determines that the mapping information corresponding to the version before update is different from the mapping information corresponding to the version after update, recognize a different mapping information item as information to be backed up, and an update unit configured to update the version of the software when the first determination unit determines that the mapping information corresponding to the version before update coincides with the mapping information corresponding to the version after update.

The present invention in a second aspect provides an information processing system which includes an information processing apparatus and updates a version of stored software, the system including a storage unit configured to store a list which makes a version of the software correspond to mapping information representing a data storage position in the information processing apparatus, a first determination unit configured to, when updating the version of the software, determine, by referring to the list stored in the storage unit, whether mapping information corresponding to a version before update is different from mapping information corresponding to a version after update, a recognition unit configured to, when the first determination unit determines that the mapping information corresponding to the version before update is different from the mapping information corresponding to the version after update, recognize a different mapping information item as information to be backed up, and an update unit configured to update the version of the software when the first determination unit determines that the mapping information corresponding to the version before update coincides with the mapping information corresponding to the version after update.

The present invention in a third aspect provides an information processing method executed in an information processing apparatus which updates a version of software stored inside or outside the information processing apparatus, the method including storing a list which makes a version of the software correspond to mapping information representing a data storage position in the information processing apparatus, determining, when updating the version of the software, by referring to the stored list, whether mapping information corresponding to a version before update is different from mapping information corresponding to a version after update, recognizing, when the mapping information corresponding to the version before update is determined in the first determination step to be different from the mapping information corresponding to the version after update, a different mapping information item as information to be backed up, and updating the version of the software when the mapping information corresponding to the version before update is determined in the first determination step to coincide with the mapping information corresponding to the version after update.

The present invention in a fourth aspect provides a storage medium storing an information processing program for updating a version of software stored inside or outside an information processing apparatus, the program causing a computer to store a list which makes a version of the software correspond to mapping information representing a data storage position in the information processing apparatus; when updating the version of the software, determine, by referring to the stored list, whether mapping information corresponding to a version before update is different from mapping information corresponding to a version after update; when the mapping information corresponding to the version before update is determined to be different from the mapping information corresponding to the version after update, recognize a different mapping information item as information to be backed up; and update the version of the software when the mapping information corresponding to the version before update is determined to coincide with the mapping information corresponding to the version after update.

The information processing apparatus can automatically determine the necessity to back up operation setting information, thereby improving the convenience of updating the version of software.

Further features of the present invention will become apparent from the following description of exemplary embodiments with reference to the attached drawings.

BRIEF DESCRIPTION OF THE DRAWINGS

FIG. 4 is a block diagram showing another hardware configuration of the monitoring apparatus.

FIG. 5 is a block diagram showing the hardware configuration of an image forming apparatus.

FIG. 10 is a view showing the concept of a processing sequence between the image forming apparatus, the distribution server, and the monitoring center host in the embodiment.

FIG. 11 is a table showing an example of a mapping file list.

FIG. 14 is a flowchart showing the sequence of processing by the distribution server in the configuration shown in FIG. 10.

FIGS. 17A to 17C are views showing an example of the firmware distribution window of the monitoring center host.

FIG. 18 is a view showing an example of a window displayed on the image forming apparatus when applying firmware.

FIG. 19 is a view showing the concept of a processing sequence between an image forming apparatus, a distribution server, and a monitoring center host in the second embodiment.

FIG. 20 is a flowchart showing the sequence of processing by the distribution server in the configuration shown in FIG. 19.

FIG. 22 is a flowchart showing the sequence of processing by the monitoring center host in the configuration shown in FIG. 19.

DESCRIPTION OF THE EMBODIMENTS

Figure 1:
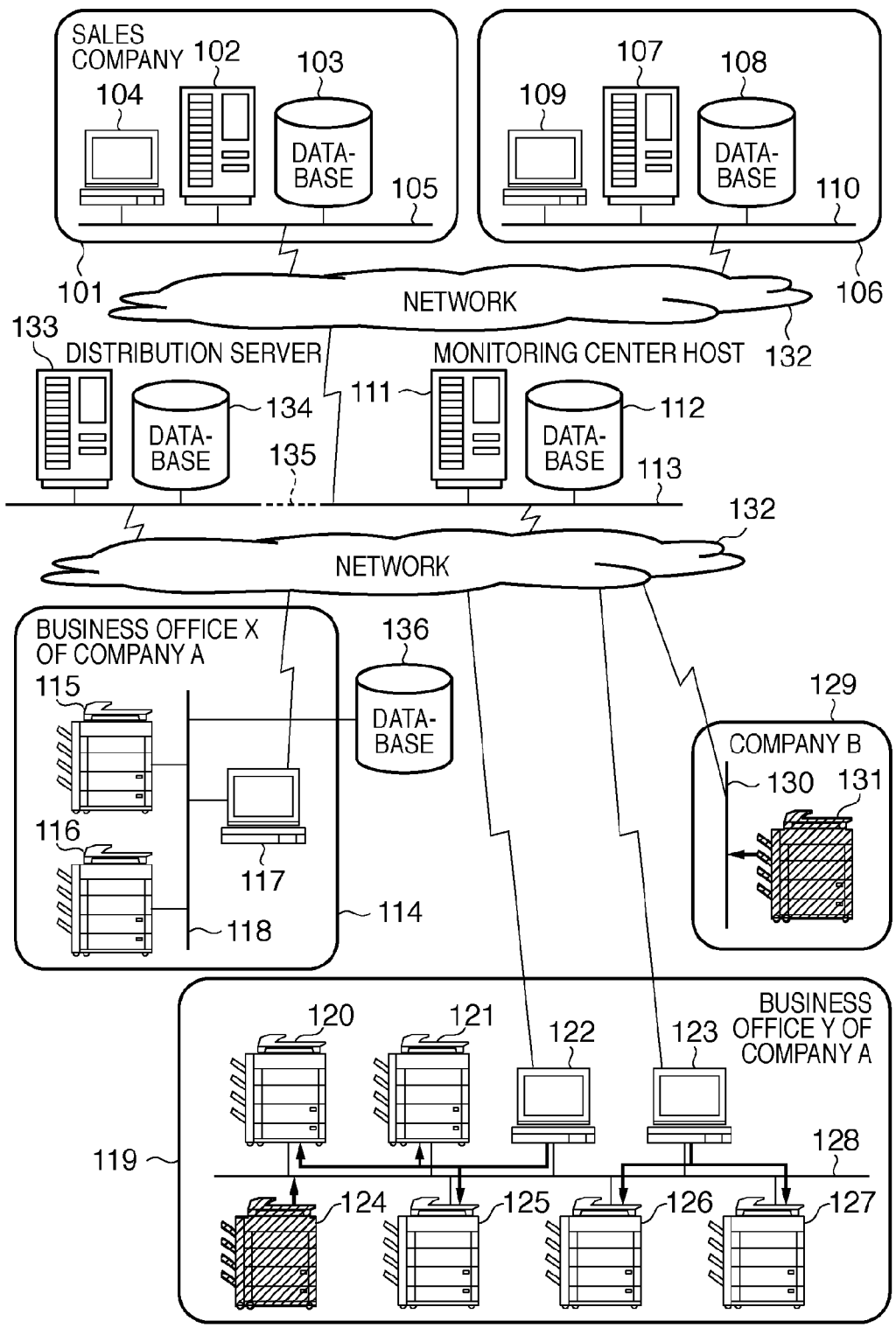
FIG. 1 is a view showing the overall configuration of a management system according to an embodiment of the present invention.

Exemplary embodiments of the present invention will be described in detail below with reference to the accompanying drawings. The same reference numerals denote the same parts, and a description thereof will not be repeated.

FIG. 1 is a view showing the overall configuration of an information processing system according to an embodiment of the present invention. In FIG. 1, the management system is connected to systems in a plurality of sales companies such as systems 101 and 106. The respective systems include databases 103 and 108 which accumulate pieces of information on the sales area, customer's sales information, and the management system. The systems 101 and 106 in sales companies also include PCs 104 and 109 which control to, for example, register and correct data in the databases 103 and 108. For example, the PCs 104 and 109 can browse data by accessing a Web site provided by a monitoring center host 111. Hosts 102 and 107 include operation units and display units, and can also function as the PCs 104 and 109. The host 102, database 103, and PC 104 are connected to each other via a LAN 105. The host 107, database 108, and PC 109 are connected to each other via a LAN 110. In FIG. 1, each system in the sales company is formed from a plurality of apparatuses, but it suffices to achieve functions to be described later. For example, the databases 103 and 108 may also be physically incorporated in the hosts 102 and 107. The databases 103 and 108 may also be installed in other places and connected via a network 132 such as the Internet as long as they can be accessed from the hosts 102 and 107. That is, each system may also be formed from one or a plurality of apparatuses.

The monitoring center host 111 is interposed between a sales company and a customer. A database 112 accumulates and stores monitoring information, the counter of an image forming apparatus that is collected from a customer, fault log information, a fault pattern table, and the like. The monitoring center host 111 and database 112 are connected to each other via a LAN 113. The LAN 113 can be connected to the Internet. The database 112 may also be physically incorporated in the monitoring center host 111. The database 112 may also be installed in another place and connected via the Internet as long as it can be accessed from the monitoring center host 111.

The monitoring center host 111 has functions of collecting information of a monitored image forming apparatus, and information (including fault information) representing the operating state from monitoring apparatuses 117, 122, and 123, and an image forming apparatus 131 (which will be described later), accumulating and processing these pieces of information, and externally outputting a warning and the like. For example, the monitoring center host 111 has a function of distributing these pieces of information to the hosts 102 and 107 in the sales companies. The operating state is represented as status information such as the absence of toner, opening of the door, exchange of the drum, the absence of the cartridge, a cooling fan abnormality, a board abnormality, contamination of the document table glass, the absence of staples, or shortage of the light quantity of the paper feed sensor. The status information also includes overflow of the font memory, a rendering error, a fixing unit abnormality, a counter abnormality, a double-sided unit abnormality, and a paper jam. The counter information includes a charging counter for charging a sales company, a department counter totaled for each customer's department, a size counter totaled for each paper size, and a component counter representing the degree of consumption of a component in an image forming apparatus. The charging counter represents the number of sheets printed by an image forming apparatus. The department counter represents the number of printed sheets for each department set by a customer. The component counter represents the number of rotations for a component such as the drum, and the time (sec) for a component such as the scanner lamp. Information representing these pieces of operating information is operating information.

The hosts 102 and 107 in the sales companies can independently register, in the monitoring center host 111, information of a monitored image forming apparatus, and monitoring settings. The monitoring center host 111 can merge and manage at once information of a monitored image forming apparatus and monitoring settings which are registered from the host of each sales company. The monitoring center host 111 can also make monitoring settings for the monitoring apparatuses 117, 122, and 123 and the image forming apparatus 131.

Services by the management system are provided based on a contract between a sales company and a customer. The management system monitors only an image forming apparatus the sales company decides to monitor under the contract. The monitoring center host 111 provides a Web page which allows a PC connected via the Internet to browse information accumulated in the database 112 or processed information. The Web page can be provided by limiting the browsing contents for each sales company, each customer, and each user authority upon user authentication. The Web page allows changing part of the data.

A distribution server 133 is interposed between a sales company and a customer. A database 134 accumulates and stores, for example, firmware, an application, and software license information to be applied to an image forming apparatus. The distribution server 133 and database 134 are connected to each other via a LAN 135, which can be connected to the Internet. The database 134 may also be physically incorporated in the distribution server 133. The database 134 may also be installed in another place and connected via the Internet as long as it can be accessed from the distribution server 133. The LANs 113 and 135 may also be formed from a single LAN, and the databases 134 and 112 may also share data.

FIG. 1 shows only one monitoring center host 111, one database 112, one distribution server 133, and one database 134. However, it is also possible to arrange pluralities of monitoring center hosts 111, databases 112, distribution servers 133, and databases 134, collect pieces of information from many image forming apparatuses or monitoring apparatuses, and distribute the load of firmware distribution.

A system configuration on the customer side will be explained. The customer side includes different environments. FIG. 1 shows customer systems 114, 119, and 129. In the customer system 114 (business office X of company A), the monitoring apparatus 117 monitors image forming apparatuses 115 and 116 connected to a LAN 118 connected to the Internet. The monitoring apparatus 117 communicates with the monitoring center host 111 via the Internet. In the customer system 119 (business office Y of company A), the monitoring apparatuses 122 and 123 manage image forming apparatuses on a LAN 128. The monitoring apparatus 122 manages image forming apparatuses 120, 121, 124, and 125, and the monitoring apparatus 123 manages image forming apparatuses 126 and 127. The monitoring apparatuses 117, 122, and 123 are connected to a database 136. The monitoring apparatuses accumulate pieces of information collected from the image forming apparatuses 115 and 116, save the processing results of accumulated data, and save, in the database 136 (not shown), settings for monitoring the image forming apparatuses as well. The database 136 (not shown) may also be connected to the LAN 118 and independently arranged. The database 136 (not shown) may also be installed in another place and connected via the Internet as long as it can be accessed from the monitoring apparatuses 117, 122, and 123. Every time the monitoring apparatus receives, from an image forming apparatus, its status information (e.g., generation of a fault), the monitoring apparatus transmits it to the monitoring center host 111.

In the customer system 129 (company B), the image forming apparatus 131 itself connected to a LAN 130 connected to the Internet directly communicates with the monitoring center host 111 via the Internet. The image forming apparatus 131 has the same functions as those of the monitoring apparatuses 117, 122, and 123, and can actively transmit its information (e.g., counter information or generation of a fault) to the monitoring center host 111.

In the system shown in FIG. 1, communication via the Internet can use the HTTP/SOAP protocol. SOAP stands for "Simple Object Access Protocol". SOAP is a protocol based on XML (eXtended Markup Language) to call data and services of a given computer from another computer. In this example, SOAP is implemented on HTTP. In SOAP communication, SOAP messages each obtained by adding supplementary information to an XML document are exchanged. A computer which supports SOAP includes a SOAP message generator which generates a SOAP message, and a SOAP message interpreter which interprets a SOAP message. In the embodiment, status information of an image forming apparatus is transmitted by a SOAP message to the monitoring center host 111. In the above description, each image forming apparatus in company A communicates with the monitoring center host 111 via the monitoring apparatus 117. However, by changing settings, each image forming apparatus in company A can also communicate with the monitoring center host without the mediacy of the monitoring apparatus 117, similar to the image forming apparatus 131 installed in company B.

Figure 2:
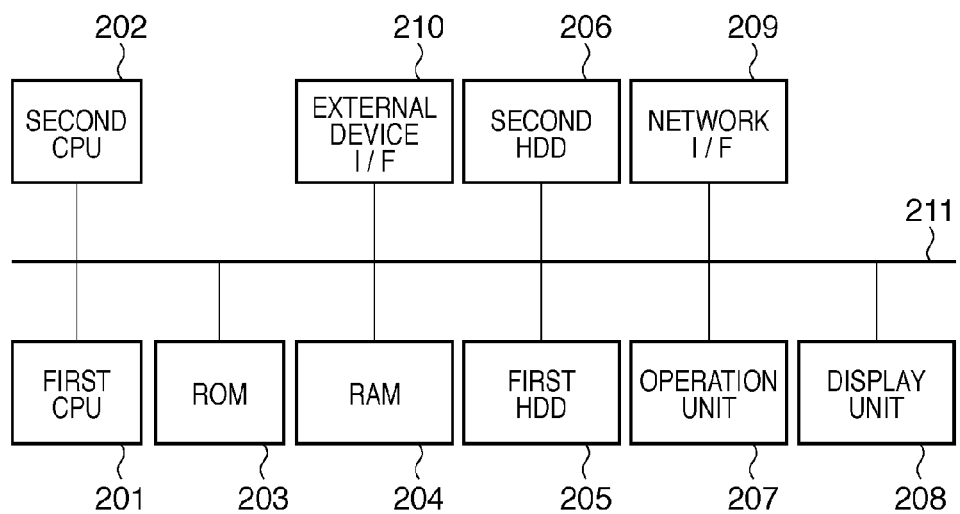
FIG. 2 is a block diagram showing the hardware configuration of a monitoring center host.

FIG. 2 is a block diagram showing the hardware configuration of the monitoring center host 111. The distribution server 133 and hosts 102 and 107 also have the same hardware configuration. In FIG. 2, a first CPU 201 and second CPU 202 control processes in the monitoring center host 111. A ROM 203 stores programs and data associated with processes in the monitoring center host 111. A RAM 204 can electrically store temporary data associated with processes in the monitoring center host 111, and can be rewritten. A first HDD 205 and second HDD 206 store programs and data associated with processes in the monitoring center host 111, temporary data, information on a monitored image forming apparatus according to the present invention, pieces of information collected from an image forming apparatus, and the like. For example, the hard disk saves the component counter, charging counter, department counter, and the like. In the monitoring center host 111, the first HDD 205 holds the programs of processes shown in FIGS. 6 and 19 (to be described later). The programs are called and executed by the first CPU 201 or second CPU 202 by using the RAM 204 as a temporary save area. In the distribution server 133, the first HDD 205 holds the programs of processes shown in FIGS. 6 and 18 (to be described later). The programs are called and executed by the first CPU 201 or second CPU 202 by using the RAM 204 as a temporary save area. An operation unit 207 includes a keyboard and pointing device which accept an instruction input to the monitoring center host 111. A display unit 208 displays the operating status of the monitoring center host 111, and information output from each program running on the monitoring center host 111. A network I/F 209 is connected to a LAN or the Internet via a network to externally exchange information. An external device I/F 210 connects an external storage device and the like. The above-described components are connected to each other via a system bus 211, and can exchange data.

Figure 3:
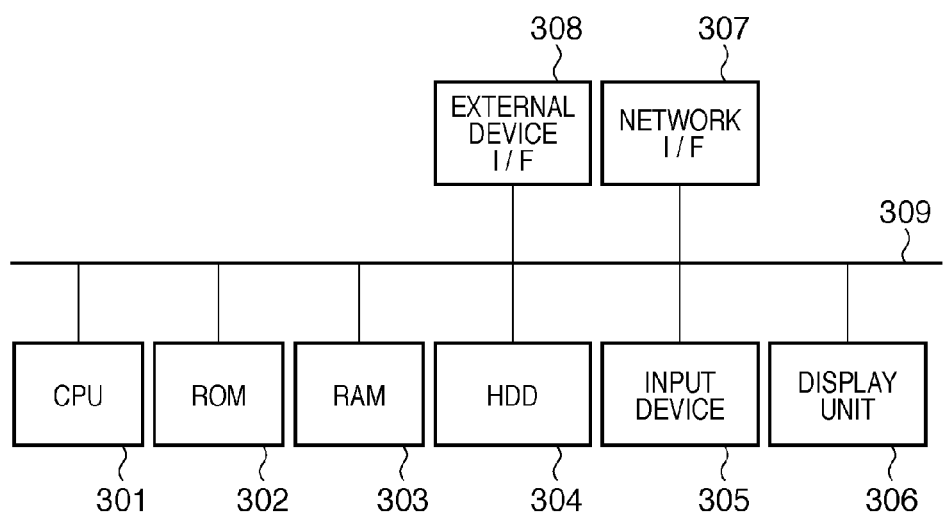
FIG. 3 is a block diagram showing the hardware configuration of a monitoring apparatus.

FIG. 3 is a block diagram showing the hardware configuration of the monitoring apparatuses 117, 122, and 123. The PCs 104 and 109 also have the same hardware configuration.

A CPU 301 controls processes in the monitoring apparatus. A ROM 302 stores programs and data associated with processes in the monitoring apparatus, and cannot be rewritten. A RAM 303 can electrically store temporary data associated with processes in the monitoring apparatus, and can be rewritten. In the monitoring apparatus 117, an HDD 304 stores programs and data associated with processes in the monitoring apparatus, temporary data, information on a monitored image forming apparatus, pieces of information collected from an image forming apparatus, and the like. In the PCs 104 and 109, the HDD 304 stores a Web browser and the like. An input device 305 includes a keyboard and pointing device which accept an instruction input to the monitoring apparatus. A display unit 306 displays the operating status of the monitoring apparatus, and information output from each program running on the monitoring apparatus. A network I/F 307 is connected to a LAN and the Internet via a network to externally exchange information. An external device I/F 308 connects an external storage device and the like. The above-described components are connected to each other via a system bus 309, and exchange data.

FIG. 4 is a block diagram showing another hardware configuration of the monitoring apparatuses 117, 122, and 123. A CPU 401 controls processes in the monitoring apparatus. A ROM 402 stores programs and data associated with processes in the monitoring apparatus, and cannot be rewritten. A flash ROM 403 stores data associated with processes in the monitoring apparatus, temporary data, information on a monitored image forming apparatus, pieces of information collected from an image forming apparatus, and the like. A serial I/F 404 outputs an error and log from a program in the monitoring apparatus, and allows connecting a terminal with a serial cable. A network I/F 405 is connected to a LAN and the Internet via a network to externally exchange information. The above-described components are connected to each other via a system bus 406, and exchange data.

FIG. 5 is a block diagram showing the hardware configuration of the image forming apparatuses 115, 116, 120, 121, 124, 125, 126, 127, and 131. Examples of the image forming apparatus are a multi-functional peripheral which integrates printer and facsimile functions, a printer (including electrophotographic and inkjet printers) which receives data from a PC and the like and prints it, a scanner, and a facsimile apparatus. FIG. 5 shows the arrangement of a multi-functional peripheral as an example of the image forming apparatus. An image reader 502 reads a document on a document feeder 501. The image reader 502 and an image forming unit 503 convert a read document or data received via a network into a print image, and print out the image. A delivery unit 504 delivers a printed sheet, and executes processes such as sorting and stapling. A network I/F 505 is connected to a LAN and the Internet via a network to externally exchange information. A CPU 506 controls processes in the image forming apparatus. The operating state of the image forming apparatus is monitored, and when a specific event such as a fault occurs, status information representing this status is sent to a predetermined destination. The destination is, for example, the monitoring center host 111 or monitoring apparatus. A nonvolatile memory serving as a ROM 507 stores programs and data associated with processes in the image forming apparatus. A rewritable RAM 508 electrically stores temporary data associated with processes in the image forming apparatus. An HDD 509 stores program and data associated with processes in the image forming apparatus, temporary data, user data transmitted to the image forming apparatus, and the like. In the image forming apparatus, the HDD 509 holds the programs of processes shown in FIGS. 8 and 20 (to be described later). The programs are called and executed by the CPU 506 by using the RAM 508 as a temporary save area. An operation unit 510 accepts an instruction input to the image forming apparatus. A display unit 511 displays the operating status of the image forming apparatus, and information on an operation to the operation unit 510. The above-described components are connected to each other via a system bus 512, and can exchange data. In the image forming apparatus 131 having a function of actively transmitting monitoring information from the device itself, the ROM 507 or HDD 509 holds programs and data associated with monitoring data transmission processing.

Figure 6:
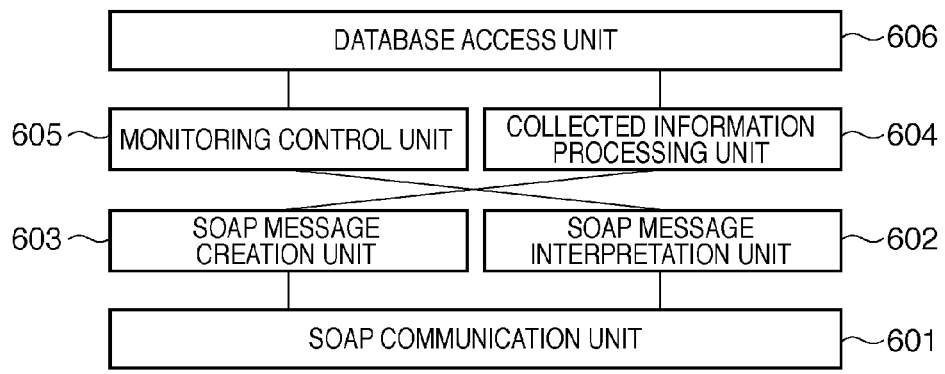
FIG. 6 is a block diagram showing a software configuration associated with an image forming apparatus management system in the monitoring center host and distribution server.

FIG. 6 is a block diagram showing a software configuration associated with an image forming apparatus management system in the monitoring center host 111 and distribution server 133. A SOAP communication unit 601 transfers, to a SOAP message interpretation unit 602, SOAP data received from the monitoring apparatus 117 or image forming apparatus 131 via the network I/F 209. Also, the SOAP communication unit 601 transmits SOAP data created by a SOAP message creation unit 603 to the monitoring apparatus 117 or image forming apparatus 131 via the network I/F 209. A collected information processing unit 604 stores, directly or upon processing in the database 112 or 134 via a database access unit 606, information received from the monitoring apparatus 117 or image forming apparatus 131 during monitoring.

The collected information processing unit 604 implements functions associated with a remote management system. For example, based on information received from the monitoring apparatus 117 or image forming apparatus 131 during monitoring, and data stored in the database 112 or database 134, the collected information processing unit 604 notifies a serviceman in charge or an administrator on the customer side of total counter information, error information, and latest firmware information. A monitoring control unit 605 manages the schedule for acquiring information from the monitoring apparatus 117 or image forming apparatus 131, and controls the monitoring contents and method. If necessary, the monitoring control unit 605 transmits an instruction to the monitoring apparatus 117 or image forming apparatus 131 during monitoring via the SOAP message creation unit 603 and SOAP communication unit 601.

Figure 7:
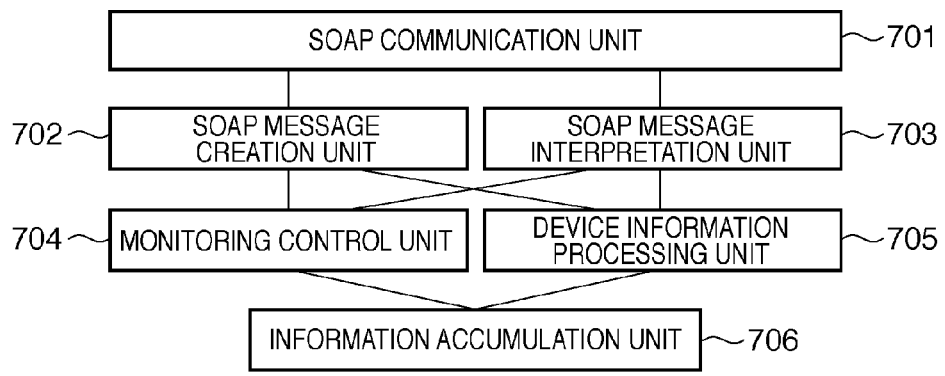
FIG. 7 is a block diagram showing a software configuration associated with the image forming apparatus management system in the monitoring apparatus.

FIG. 7 is a block diagram showing a software configuration associated with the image forming apparatus management system in the monitoring apparatuses 117, 122, and 123. A SOAP communication unit 701 transfers, to a SOAP message interpretation unit 703, SOAP data received from the monitoring center host 111 via the network I/F 307 or 405. Also, the SOAP communication unit 701 transmits SOAP data created by a SOAP message creation unit 702 to the monitoring center host 111 or distribution server 133 via the network I/F 307 or 405. In accordance with monitoring settings (to be described later) from the monitoring center host 111, a monitoring control unit 704 updates monitored image forming apparatus information held in an information accumulation unit 706, acquires information of the image forming apparatuses 115 and 116, and manages the schedule. According to the schedule managed by the monitoring control unit 704, a device information processing unit 705 accumulates, in the information accumulation unit 706, pieces of counter information actively collected by the monitoring apparatus from the image forming apparatuses 115 and 116, and information such as a service call, jam, or the absence of toner. Pieces of information are accumulated in accordance with the states of the image forming apparatuses 115 and 116. Data accumulated in the information accumulation unit 706 is directly transferred to the SOAP message creation unit 702 via the device information processing unit 705, and transmitted to the monitoring center host 111. In some cases, the accumulated data is interpreted and processed in the device information processing unit 705, then transferred to the SOAP message creation unit 702, and transmitted to the monitoring center host 111.

Figure 8:
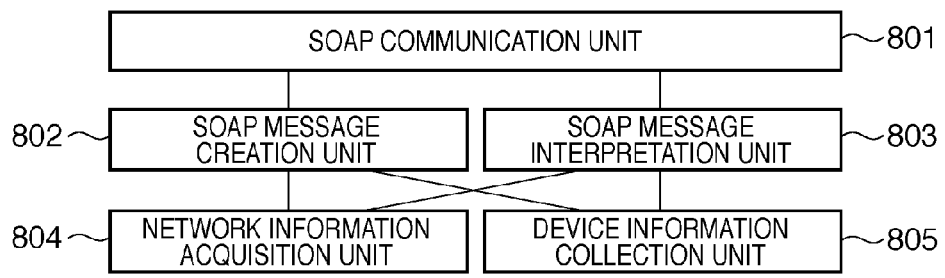
FIG. 8 is a block diagram showing a software configuration associated with the image forming apparatus management system in the image forming apparatus.

FIG. 8 is a block diagram showing a software configuration associated with the image forming apparatus management system in the image forming apparatuses 115, 116, 120, 121, 124, 125, 126, 127, and 131. A SOAP communication unit 801 transfers, to a SOAP message interpretation unit 803, SOAP data received from the monitoring center host 111 or distribution server 133 via the network I/F 505. Also, the SOAP communication unit 801 transmits SOAP data created by a SOAP message creation unit 802 to the monitoring center host 111 or distribution server 133 via the network I/F 505. A network information acquisition unit 804 can automatically acquire an IP address, DNS server, and gateway address in the DHCP environment. When there is network information which is input from the operation unit 510 and saved in the HDD 509, the information may also be acquired. A device information collection unit 805 can acquire internally held counter information in accordance with the schedule in the multi-functional peripheral or an instruction from the monitoring center host 111. The device information collection unit 805 can also acquire information such as an internally generated service call, jam, or the absence of toner. Acquired data is directly transferred to the SOAP message creation unit 802, or accumulated, interpreted, and processed in the device information collection unit 805 and then transferred to the SOAP message creation unit 802. The data transferred to the SOAP message creation unit 802 is transmitted to the monitoring center host 111.

Figure 9:
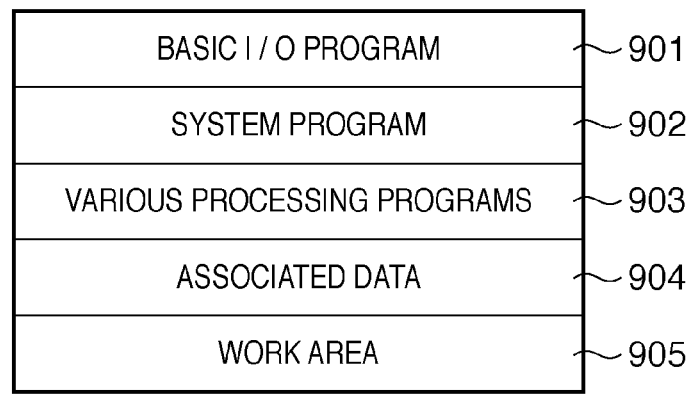
FIG. 9 is a view showing the structure of a memory map in the monitoring center host, distribution server, monitoring apparatus, and image forming apparatus.

FIG. 9 is a view showing the structure of a memory map in the monitoring center host 111, the distribution server 133, the monitoring apparatuses 117, 122, and 123, or the image forming apparatuses 115, 116, 120, 121, 124, 125, 126, 127, and 131. When executing a processing program in the embodiment, the program is loaded into the RAM 204 in the monitoring center host 111, the RAM 303 or flash ROM 403 in the monitoring apparatus 117, or the RAM 508 in the image forming apparatus. The memory map is formed from a basic I/O program 901, a system program 902, various processing programs 903 including a processing program in the embodiment, an area 904 for storing associated data, and a work area 905 for a program. The basic I/O program 901 controls input/output to/from the apparatus. The system program 902 provides an operating environment to each processing program. When areas used as the programs 901 to 903 and the areas 904 and 905 run short due to limited capacity, it is also possible to use the first HDD 205 or second HDD 206 as a partial area of the RAM 204, the HDD 304 as that of the RAM 303, and the HDD 509 as that of the RAM 508.

FIG. 10 is a view showing the concept of a processing sequence between the image forming apparatus, the distribution server, and the monitoring center host in the embodiment. FIG. 10 shows an image forming apparatus 1020 as an apparatus which implements an operation in the embodiment. However, the present invention is not limited to an image forming apparatus for forming an image, and is also applicable to an information processing apparatus which generally processes data. The processing sequence will be explained in detail with reference to FIG. 10. In step S1001, a person in charge in a sales company registers firmware in the distribution server. At this time, information on the firmware version, model name, and mapping file is registered. The mapping file represents a list which describes the model name, the firmware version, and mapping information of the nonvolatile memory and hard disk, as shown in FIG. 11. FIG. 11 will be explained later. For example, for a nonvolatile memory, the mapping file describes address information, in the memory space, of the destination table, BOX information, and service mode information stored in the nonvolatile memory of a device. An example of mapping information is address information in the memory space in the image forming apparatus. For example, the mapping information represents the storage position of data (including a program such as software) in the memory of the image forming apparatus. Examples of the mapping information are an address where the destination table including e-mail is stored, an address representing the memory position of the BOX, and an address where service mode information called in the administrator mode is stored. The address includes start and end addresses, a start address and offset representation, and information representing other storage locations in the memory. The BOX is a predetermined storage area where, for example, data having undergone image processing is stored. The BOX is formed from an HDD or the like.

In step S1002, the person in charge in the sales company selects the version of firmware to be updated, and designates distribution of the firmware from the firmware distribution window of the monitoring center host that is shown in FIGS. 17A to 17C (to be described later). In step S1003, the monitoring center host designates distribution of the firmware to the image forming apparatus, and notifies the image forming apparatus of the firmware version after update.

In step S1004, the image forming apparatus requests the distribution server to download the firmware, and transmits information on the model name/serial number/the current firmware version of the image forming apparatus/requested firmware version. The model name is the name of the image forming apparatus, and the serial number is an individual ID assigned to each image forming apparatus. In step S1005, the distribution server transmits, to the image forming apparatus, the requested firmware body and a mapping file corresponding to the requested firmware version.

In step S1006, the image forming apparatus compares the mapping file of the requested firmware version of the model received in step S1005 with that of the current firmware version held in the image forming apparatus. In the embodiment, the image forming apparatus has the mapping file correspondence table of the current firmware version shown in FIG. 11. Assume that "ABCD" is to be upgraded from Ver 1.0 (version before update) to Ver 1.1 (version after update). The addresses of BOX information and service mode information in the nonvolatile memory are different in the table of FIG. 11, so the image forming apparatus determines that the mapping files are "different". The determination processing in step S1006 is an example of "first determination means".

If the image forming apparatus determines "different" as a result of the comparison in step S1006, it recognizes an item mapped at the different address as information to be backed up, and determines in step S1007 to manually update the firmware of the image forming apparatus. The information may also be stored in another storage area so that it can be recognized from another information. For example, the recognized mapped item can be displayed on the window as information to be backed up. If the image forming apparatus determines that the mapping files coincide with each other, it determines to automatically update the firmware of the image forming apparatus.

If the image forming apparatus determines "automatic update" in step S1007, it updates the firmware in step S1008, and ends the process. If the image forming apparatus determines "manual update", it determines in step S1009 whether the different item in the mapping file has a default value. For example, when the different item is the "destination table" and no mail address is registered in the destination table, it is determined that this value is the default. In the embodiment, the default value may also be stored in advance in a memory area such as the ROM of the image forming apparatus. The determination processing in step S1009 is an example of "second determination means".

If the image forming apparatus determines in step S1009 that the different item has a default value, it changes the determination from "manual update" to "automatic update" in step S1010 because there is no data to be backed up. The image forming apparatus updates the firmware, and ends the process. If the image forming apparatus determines that the different item does not have a default value, it waits in step S1011 in order to manually update the firmware.

In step S1012, the image forming apparatus notifies the monitoring center host of the determination result in step S1010 or S1011. If the determination result is "automatic update", the monitoring center host does nothing. If the determination result is "manual update", the monitoring center host instructs a serviceman by mail or the like to go to the image forming apparatus. The serviceman goes to the image forming apparatus which has waited in step S1011. Then, the serviceman backs up configuration information (information in the nonvolatile memory and hard disk), and updates the firmware by using the firmware application window of the image forming apparatus that is shown in FIG. 18.

FIG. 11 is a table showing an example of the mapping file correspondence table. The mapping file describes information on the model name, firmware version, and nonvolatile memory/hard disk. An item 1101 represents the model name of an image forming apparatus. An item 1102 represents a firmware version corresponding to the model name of the item 1101. An item 1103 represents the contents of a mapping file corresponding to the model name in the item 1101 and the firmware version in the item 1102. The item 1103 shows that a destination table which corresponds to firmware versions "Ver 1.0" and "Ver 1.2" and is saved in the nonvolatile memory is stored at address "0x0021".

Figure 12:
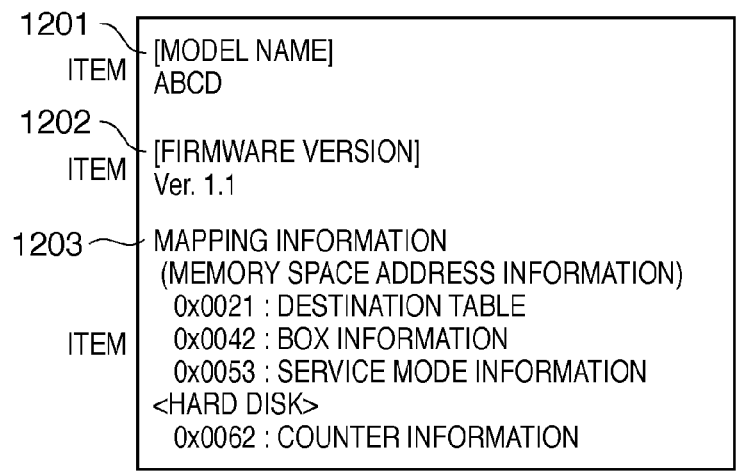
FIG. 12 is a view showing an example of a mapping file.

FIG. 12 is a view showing an example of the mapping file of each version. An item 1201 represents the model name. An item 1202 represents the firmware version. An item 1203 represents mapping information of the nonvolatile memory/hard disk.

Figure 13:
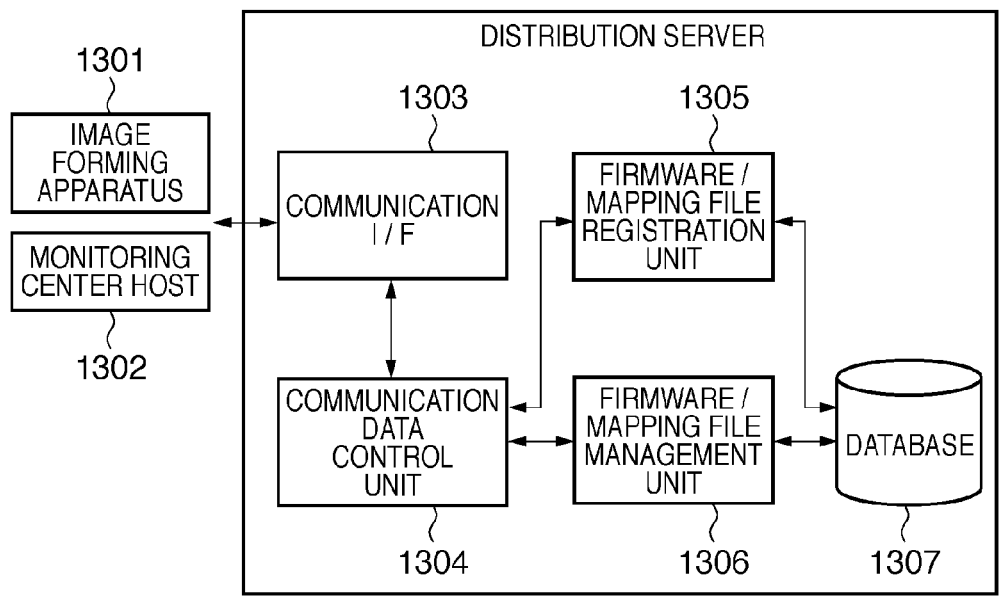
FIG. 13 is a block diagram showing the arrangement of the distribution server.

FIG. 13 is a block diagram showing the arrangement of the distribution server. As shown in FIG. 13, the distribution server communicates with an image forming apparatus 1301 and monitoring center host 1302. A communication I/F 1303 in the distribution server receives data from the image forming apparatus 1301 or monitoring center host 1302. A communication data control unit 1304 controls a firmware/mapping file registration unit 1305 to register data received in the communication I/F 1303 as a firmware body and corresponding mapping file in a database 1307. A firmware/mapping file management unit 1306, for example, refers to or totals firmware and mapping files registered in the database 1307. The database 1307 stores firmware and mapping files.

FIG. 14 is a flowchart showing a processing sequence when paying attention to the distribution server in the configuration shown in FIG. 10. In step S1401, firmware is uploaded to the distribution server and newly registered. Data at this time includes the firmware version, model name, and mapping file, as represented by D1402. In step S1403, the distribution server receives a firmware download request transmitted from the image forming apparatus. Data at this time includes the model name, serial number, current firmware version, and requested firmware version, as represented by D1404. In step S1405, the distribution server distributes the firmware version requested in step S1403 to the image forming apparatus. Data at this time includes the firmware body and mapping file, as represented by D1406.

Figure 15A:
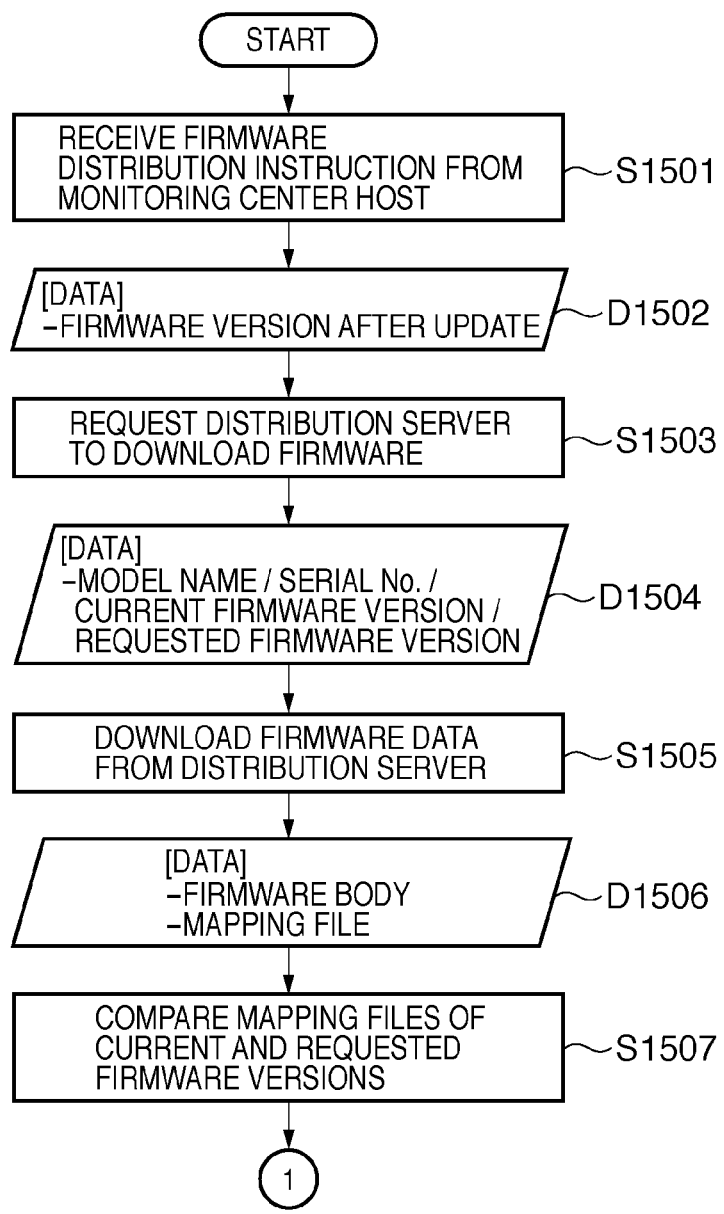
FIGS. 15A and 15B are flowcharts showing the sequence of processing by the image forming apparatus in the configuration shown in FIG. 10.
Figure 15B:
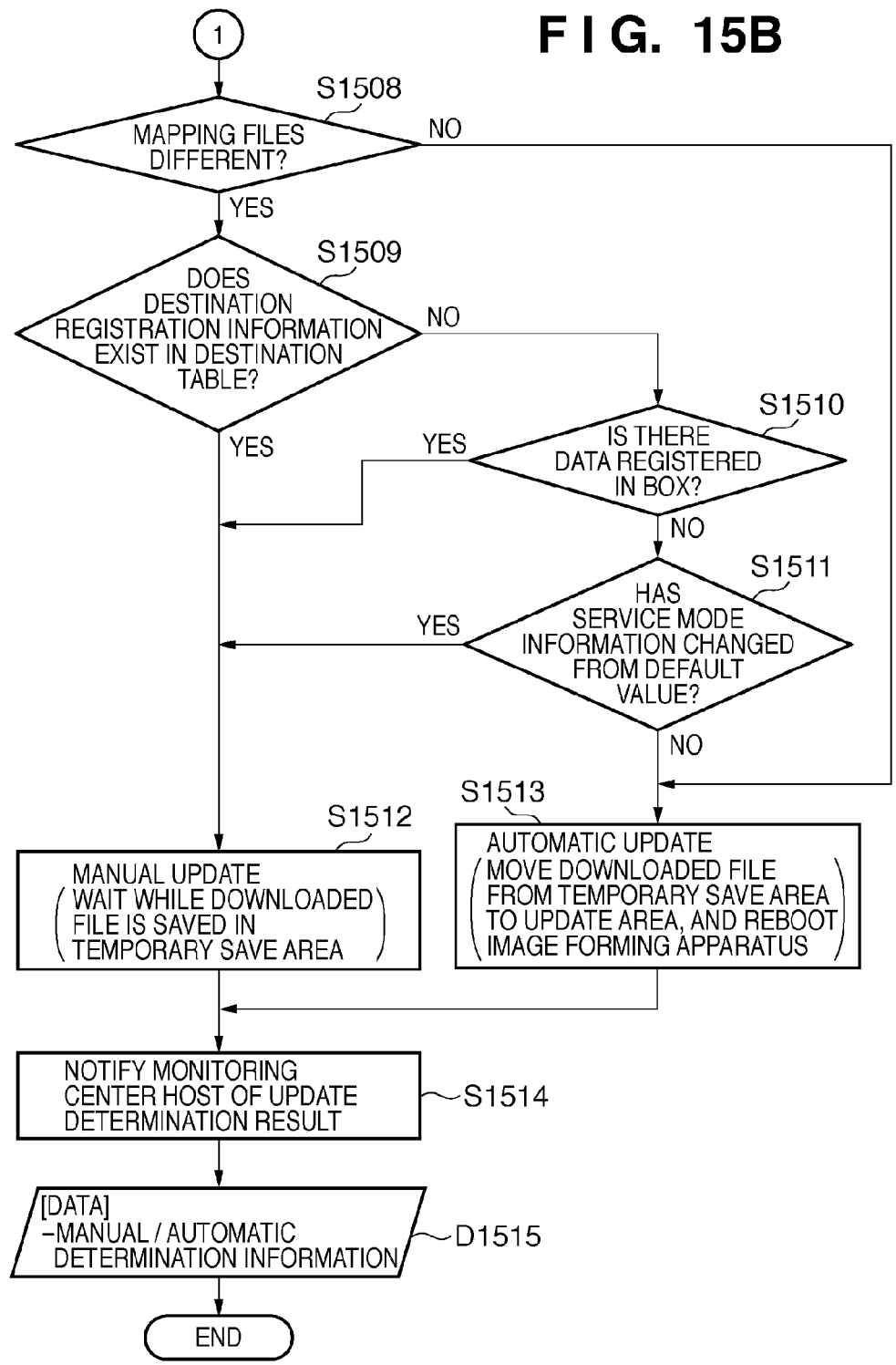

FIGS. 15A and 15B are flowcharts showing a processing sequence when paying attention to the image forming apparatus in the configuration shown in FIG. 10. In step S1501, the image forming apparatus receives a firmware distribution instruction from the monitoring center host. Data at this time includes a firmware version after update, as represented by D1502. In step S1503, the image forming apparatus requests the distribution server to download firmware. Data at this time includes the model name, serial number, current firmware version, and requested firmware version of the image forming apparatus, as represented by D1504. In step S1505, the image forming apparatus downloads data from the distribution server. Data at this time includes the firmware body and mapping file, as represented by D1506.

In step S1507, the image forming apparatus compares the mapping file of the current (i.e., before update) firmware version held in the image forming apparatus with that of the requested (i.e., after update) firmware version. The processing in step S1507 will be explained with reference to FIG. 11. Assume that the current firmware version is "Ver 1.0", and the requested firmware version is "Ver 1.1". As a result of comparing the items 1103 in these two mapping files, the address of the destination table remains unchanged as "0x0021". However, the addresses of BOX information are "0x0032" and "0x0042" and are different, and those of service mode information are "0x0055" and "0x0053" and are different. In this manner, in step S1507, the image forming apparatus compares whether these two mapping files are different.

In step S1508, the image forming apparatus determines whether these two mapping files are different as a result of the comparison in step S1507. If the image forming apparatus determines that these two mapping files are different, it advances to step S1509 to verify, in step S1509 and subsequent steps, which information is different. If the image forming apparatus determines that these two mapping files coincide with each other, it advances to step S1513. In step S1513, the file downloaded into the image forming apparatus is moved from the temporary save area to the update area. Then, the image forming apparatus is rebooted to apply the firmware and automatically update it.

In step S1509, the image forming apparatus determines whether destination registration information exists in the destination table of the image forming apparatus. If the image forming apparatus determines that the information exists, it advances to step S1512; if it determines that no information exists, to step S1510.

In step S1512, the image forming apparatus saves the downloaded file (firmware) in the temporary save area, and waits. A serviceman visits the customer later, backs up configuration information such as the destination table, BOX information, and service mode information, and applies the firmware to update it (manual update).

In step S1510, the image forming apparatus determines whether there is data registered in BOX information of the image forming apparatus. If the image forming apparatus determines that there is the data, it advances to step S1512; if it determines that there is no data, to step S1511. In step S1511, the image forming apparatus determines whether the service mode information has changed from a default value. If the image forming apparatus determines that the service mode information has changed, it advances to step S1512; if it determines that no service mode information has changed, to step S1513. That is, in steps S1509 to S1511, it can be determined whether the current configuration information is a default value. The default value may also be stored in, for example, the memory of the image forming apparatus and used in the determinations in steps S1509 to S1511.

In step S1514, the image forming apparatus notifies the monitoring center host that it is determined to update firmware manually or automatically. Data at this time includes manual/automatic determination information, as represented by D1515.

Figure 16:
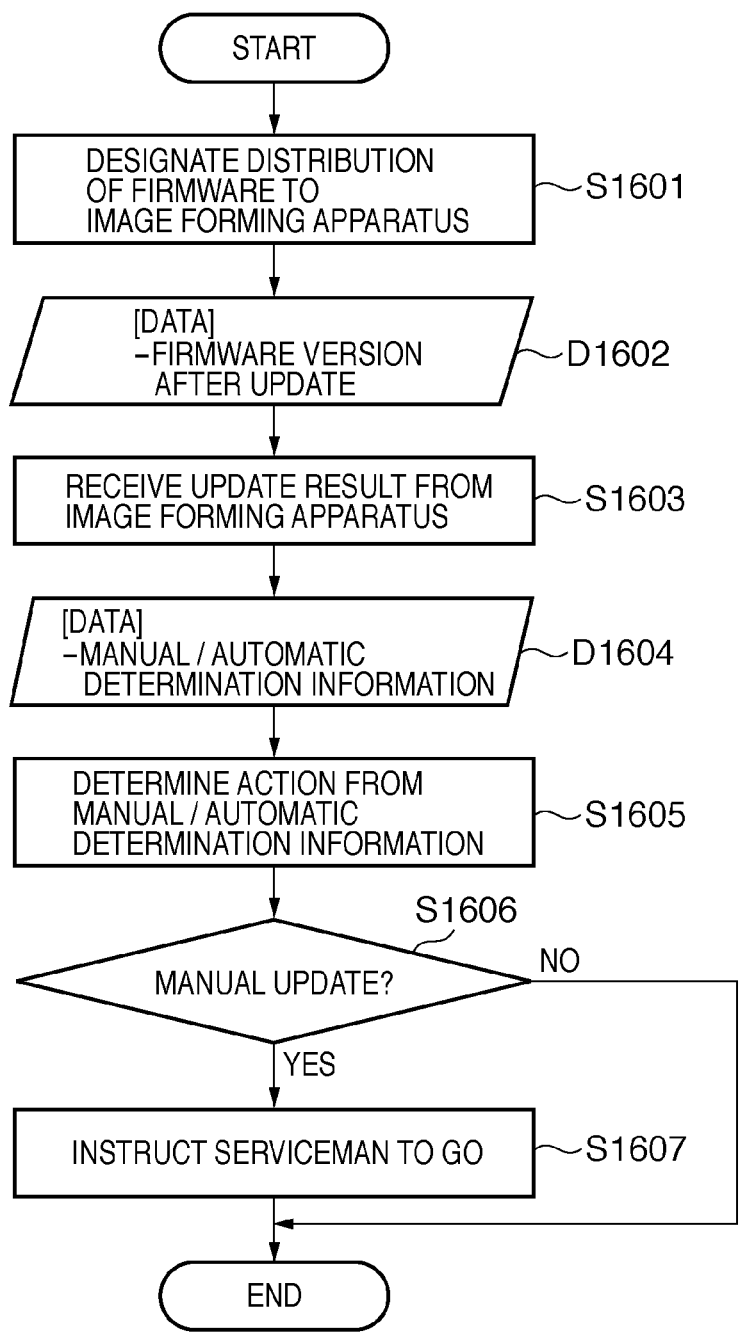
FIG. 16 is a flowchart showing the sequence of processing by the monitoring center host in the configuration shown in FIG. 10.

FIG. 16 is a flowchart showing a processing sequence when paying attention to the monitoring center host in the configuration shown in FIG. 10. In step S1601, the monitoring center host designates distribution of firmware to the image forming apparatus. Data at this time includes a firmware version after update, as represented by D1602. In step S1603, the monitoring center host receives, from the image forming apparatus, the result of determining whether to update firmware manually or automatically. Data at this time includes manual/automatic determination information, as represented by D1604.

In step S1605, the monitoring center host determines its action from the received manual/automatic determination information. In step S1606, the monitoring center host determines whether the determination result in step S1605 is manual update. If the monitoring center host determines that the determination result in step S1605 is manual update, it advances to step S1607. If the monitoring center host determines that the determination result in step S1605 is automatic update, it ends the process. In step S1607, the monitoring center host notifies a serviceman by mail or the like in cooperation with, for example, a mail server. The notified serviceman goes to the image forming apparatus. As described above, the serviceman backs up configuration information such as the destination table, BOX information, and service mode information, and applies the firmware to update it (manual update).

FIGS. 17A to 17C are views showing an example of the firmware distribution window of the monitoring center host. In FIGS. 17A to 17C, a display window 1701 is a search window used to specify an image forming apparatus serving as a distribution target. A display item 1702 shows search results in the display window 1701, and allows a person in charge to select an image forming apparatus serving as a distribution target. A display item 1703 is an item used to select a firmware update method. A display item 1704 shows the version of firmware to be distributed, and allows the person in charge to select the version from a pull-down menu. A display item 1705 shows the date and time when distributing firmware, and allows the person in charge to designate the date and time.

FIG. 18 is a view showing an example of a window displayed on the image forming apparatus when applying firmware. Display windows 1801 and 1802 are windows when the serviceman manually applies firmware. Display windows 1803 and 1804 are windows when firmware is automatically applied. The applied firmware can be confirmed from the display window 1804. The display window 1801 notifies the serviceman that new firmware has been downloaded in the image forming apparatus. The display window 1801 further shows items which need to be backed up. The serviceman can apply the new firmware by backing up necessary information and pressing an Apply button in the display window 1802. After that, the serviceman writes back the backed-up information in the image forming apparatus.

When firmware is automatically applied, the user can confirm from the display window 1803 that the new firmware has been applied. The display window 1804 shows an example of detailed information of the applied firmware. The window shown in FIG. 18 may also be displayed on the display unit 306 of the monitoring apparatus. In this case, the serviceman may also go to the monitoring apparatus, confirm, on the window, configuration data to be backed up, and back up configuration data of the image forming apparatus by a remote operation. As described above, according to the embodiment, it can be automatically determined whether configuration information (operation setting information) in the nonvolatile memory of an image forming apparatus, or the like needs to be backed up. The embodiment can, therefore, reduce the possibility of backing up erroneous data in automatic/manual upgrading of firmware.

The second embodiment according to the present invention will be explained. FIG. 19 is a view showing the concept of a processing sequence between an image forming apparatus, a distribution server, and a monitoring center host in the second embodiment. The processing sequence will be explained in detail with reference to FIG. 19. The second embodiment is different from the first embodiment in that distribution server executes the processes in steps S1006 and S1007 shown in FIG. 10. In step S1901, a person in charge in a sales company registers firmware in the distribution server. As information at this time, the person in charge registers the firmware version, model name, and mapping file. The mapping file is the same as that shown in FIG. 11. In step S1902, the person in charge in the sales company selects the version of firmware to be updated, and designates distribution of the firmware from the firmware distribution window of the monitoring center host that is shown in FIGS. 17A to 17C. In step S1903, the monitoring center host designates distribution of the firmware to the image forming apparatus, and notifies the image forming apparatus of the firmware version after update. In step S1904, the image forming apparatus transmits, to the distribution server, a firmware download request, and information on the model name of the image forming apparatus/serial number/ the current (before update) or requested (after update) firmware version of the image forming apparatus. In step S1905, the distribution server compares the mapping file of the requested firmware version of the firmware received in step S1904 with that of the current firmware version.

In the second embodiment, the distribution server has a mapping file correspondence table as shown in FIG. 11 for each image forming apparatus. For example, the table in FIG. 11 is looked up when upgrading "ABCD" from "Ver 1.0" to "Ver 1.1". Then, the addresses of the BOX information in the nonvolatile memory are different between these mapping files, so the distribution server determines that the mapping files are "different".

If the distribution server determines "different" as a result of the comparison in step S1905, it determines "manually update" in step S1906. If the distribution server determines that the mapping files coincide with each other, it determines "automatically update". In step S1907, the distribution server transmits the firmware body requested from the image forming apparatus, mapping difference information, and manual/ automatic determination information. If the manual/automatic determination information represents "automatic update", the image forming apparatus updates the firmware in step S1908, and ends the process.

If the manual/automatic determination information represents "manual update, the image forming apparatus determines in step S1909 whether the different item has a default value. For example, when the different item is the "destination table" and no mail address is registered in the destination table, it is determined that this value is default. If the image forming apparatus determines in step S1909 that the different item has a default value, it changes the determination from "manual update" to "automatic update" in step S1910 because there is no data to be backed up. The image forming apparatus updates the firmware, and ends the process. If the image forming apparatus determines that the different item does not have a default value, it waits in step S1911 in order to manually update the firmware.

In step S1912, the image forming apparatus notifies the monitoring center host of the determination result in step S1910 or S1911. If the determination result is automatic update, the monitoring center host does nothing. If the determination result is manual update, the monitoring center host instructs a serviceman by mail or the like to go to the image forming apparatus. The serviceman goes to the image forming apparatus which has waited in step S1911. Then, the serviceman backs up configuration information (information in the nonvolatile memory and hard disk), and updates the firmware by using the firmware application window of the image forming apparatus that is shown in FIG. 18.

FIG. 20 is a flowchart showing a processing sequence when paying attention to the distribution server in the configuration shown in FIG. 19. In step S2001, firmware is uploaded to the distribution server and newly registered. Data at this time includes the firmware version, model name, and mapping file, as represented by D2002. In step S2003, the distribution server receives a firmware download request from the image forming apparatus. Data at this time includes the model name, serial number, current firmware version, and requested firmware version, as represented by D2004. In step S2005, the distribution server looks up the mapping file correspondence table shown in FIG. 11 for each image forming apparatus to compare the mapping files of the current and requested firmware versions.

In step S2006, the distribution server determines whether the mapping files are different as a result of the comparison. If the distribution server determines that the mapping files are different, it advances to step S2007; if it determines that the mapping files coincide with each other, to step S2008.

In step S2007, the distribution server instructs the image forming apparatus to manually update the firmware. In step S2008, the distribution server instructs the image forming apparatus to automatically update the firmware. Data at this time includes the firmware body, mapping difference information, and manual/automatic determination information, as represented by D2009.

Figure 21A:
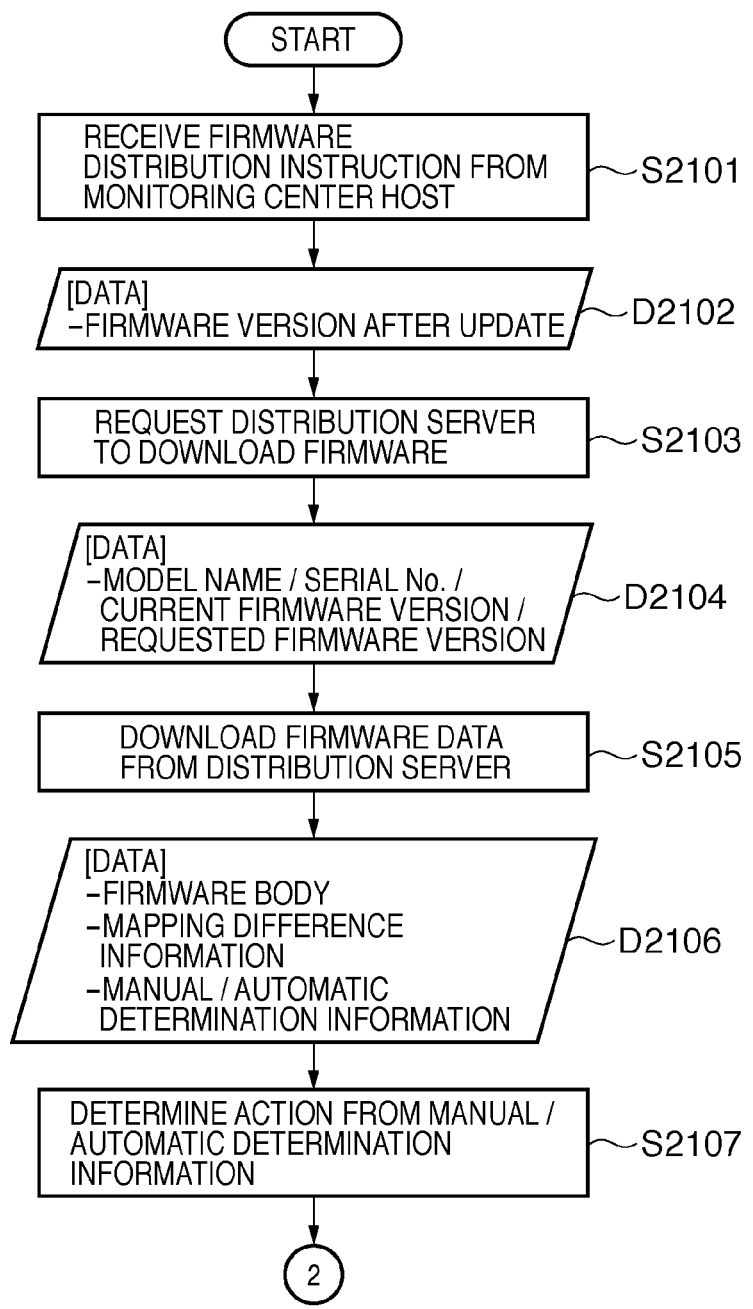
FIGS. 21A and 21B are flowcharts showing the sequence of processing by the image forming apparatus in the configuration shown in FIG. 19.
Figure 21B:
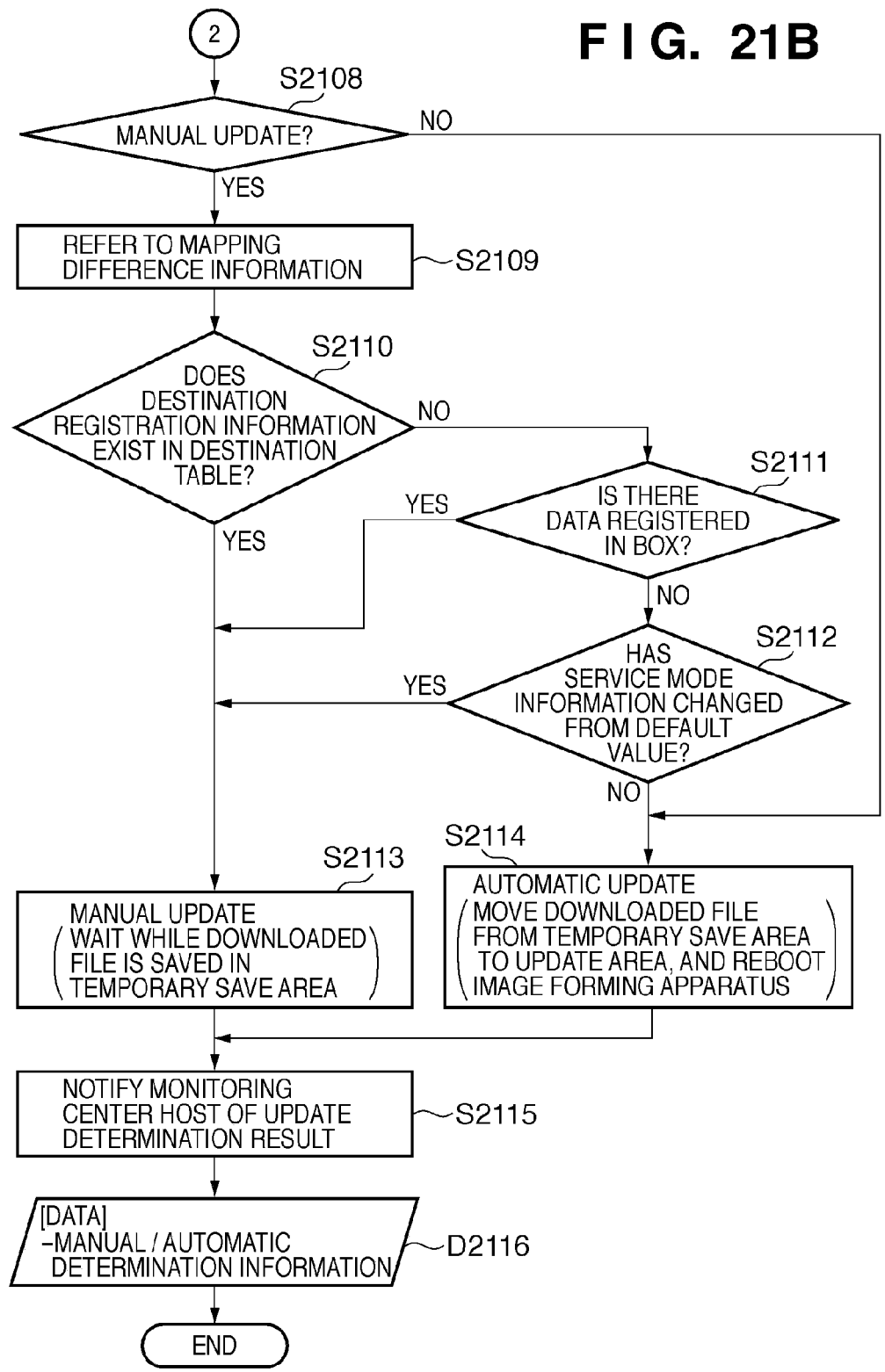

FIGS. 21A and 21B are flowcharts showing a processing sequence when paying attention to the image forming apparatus in the configuration shown in FIG. 19. In step S2101, the image forming apparatus receives a firmware distribution instruction from the monitoring center host. Data at this time includes a firmware version after update, as represented by D2102. In step S2103, the image forming apparatus requests the distribution server to download firmware. Data at this time includes the model name, serial number, current firmware version, and requested firmware version of the image forming apparatus, as represented by D2104. In step S2105, the image forming apparatus downloads data from the distribution server. Data at this time includes the firmware body, mapping difference information, and manual/automatic determination information, as represented by D2106.

In step S2107, the image forming apparatus determines its action from the downloaded manual/automatic determination information. If the image forming apparatus determines in step S2108 that the determination result in step S2107 is manual update, it advances to step S2109. If the image forming apparatus determines that the determination result in step S2107 is automatic update, it advances to step S2114. In step S2114, the file (firmware) downloaded into the image forming apparatus is moved from the temporary save area to the update area. Then, the image forming apparatus is rebooted to apply and update the firmware (automatic update).

In step S2109, the image forming apparatus further refers to the downloaded mapping difference information. In step S2110 and subsequent steps, the image forming apparatus determines whether the item of the mapping difference information has a default value. In step S2110, the image forming apparatus determines whether destination registration information exists in the destination table of the image forming apparatus. If the image forming apparatus determines that the information exists, it advances to step S2113; if it determines that no information exists, to step S2111. In step S2113, the image forming apparatus saves the downloaded file (firmware) in the temporary save area, and waits. A serviceman visits the customer later, backs up configuration information such as the destination table, BOX information, and service mode information, and applies the firmware to update it.

In step S2111, the image forming apparatus determines whether there is data registered in BOX information of the image forming apparatus. If the image forming apparatus determines that there is the data, it advances to step S2113; if it determines that there is no data, to step S2112. In step S2112, the image forming apparatus determines whether the service mode information has changed from a default value. If the image forming apparatus determines that the service mode information has changed, it advances to step S2113; if it determines that no service mode information has changed, to step S2114. That is, in steps S2110 to S2112, it can be determined whether the current configuration information is a default value. The default value may also be stored in, for example, the memory of the image forming apparatus and used in the determinations in steps S2110 to S2112. In step S2115, the image forming apparatus notifies the monitoring center host that it is determined to update firmware manually or automatically. Data at this time includes manual/automatic determination information, as represented by D2116.

FIG. 22 is a flowchart showing a processing sequence when paying attention to the monitoring center host in the configuration shown in FIG. 19. In step S2201, the monitoring center host designates distribution of firmware to the image forming apparatus. Data at this time includes a firmware version after update, as represented by D2202. In step S2203, the monitoring center host receives, from the image forming apparatus, the result of determining whether to update firmware automatically or manually. Data at this time includes manual/automatic determination information, as represented by D2204. In step S2205, the monitoring center host determines its action from the received manual/automatic determination information. If the monitoring center host determines in step S2206 that the determination result in step S2205 is manual update, it advances to step S2207. If the monitoring center host determines in step S2206 that the determination result in step S2205 is automatic update, it ends the process. In step S2207, the monitoring center host notifies a serviceman by mail or the like in cooperation with, for example, a mail server. The notified serviceman goes to the image forming apparatus. As described above, the serviceman backs up configuration information such as the destination table, BOX information, and service mode information, and applies the firmware to update it (manual update).

The present invention may also be applied to a system including a plurality of devices (e.g., a host computer, interface device, reader, and printer) or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the program codes and the storage medium which stores the program codes constitute the present invention.

The present invention also includes a case where an OS (Operating System) or the like running on a computer performs part or all of actual processing on the basis of the instructions of the codes of a program (information processing program) and thereby implements the functions of the above-described embodiments. Furthermore, the present invention is also applied to a case where the program codes read out from the storage medium are written in the memory of a function expansion card inserted into the computer or the memory of a function expansion unit connected to the computer. In this case, the CPU of the function expansion card or function expansion unit performs part or all of actual processing on the basis of the instructions of the written program codes, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-011929, filed Jan. 22, 2008 which is hereby incorporated by reference herein in its entirety.

What is claimed is:

1. An information processing apparatus which updates software, the apparatus comprising:
a storage medium; and
a computer processor configured to execute at least one computer program, the at least one computer program comprising program code that, when executed by the computer processor, implements the acts of:
storing a list in the storage medium, wherein the list associates a version of the software before an update and a version of the software after the update with mapping information representing a plurality of data storage positions of respective data categorized into an item of a plurality of items, and wherein the data storage position indicates a position in the information processing apparatus;
determining, by referring to the list stored in the storage medium, whether or not the data storage position of the data categorized into a specified item in the mapping information corresponding to the software's version before the update exists in the mapping information corresponds to the software's version after the update;
determining whether or not the data categorized into the specified item in the mapping information corresponding to the software's version before the update has a preset default value, when the data storage position of the data categorized into the specified item in the mapping information corresponding to the software's version before the update is determined not to exist in the mapping information corresponding to the software's version after the update;
recognizing the specified item as information to be backed up, when the data categorized into the specified item in the mapping information corresponding to the software's version before the update is determined not to have the preset default value; and
updating the software, when the data categorized into the specified item in the mapping information corresponding to the software's version before the update is determined to have the preset default value,
wherein the data categorized into the specified item in the mapping information corresponding to the software's version before the update is determined to have the preset default value, when no registered content exists regarding the specified item, and
wherein the specified item includes a destination table, and in a case where the specified item is the destination table, the data categorized into the specified item in the mapping information corresponding to the software's version before the update is determined to have the preset default value when the destination table has no mail address as the registered content.

2. The apparatus according to claim 1, wherein the program code further implements the act of displaying, on the information processing apparatus, the recognized information.

3. The apparatus according to claim 1, wherein the recognized information is allowed to be manually backed up and the software is allowed to be manually updated by a user.

4. The apparatus according to claim 1, wherein the preset default value is basic format data for the specified item.

5. An information processing system which includes an information processing apparatus which updates software, the system comprising:
 a storage medium;
 a computer processor configured to execute at least one computer program, the at least one computer program comprising program code that, when executed by the computer processor, implements the acts of:
  storing a list in the storage medium, wherein the list associates a version of the software before an update and a version of the software after the update with mapping information representing a plurality of data storage positions of respective data categorized into an item of a plurality of items, and wherein the data storage position indicates a position in the information processing apparatus;
  determining, by referring to the list stored in the storage medium, whether or not the data storage position of the data categorized into a specified item in the mapping information corresponding to the software's version before the update exists in the mapping information corresponds to the software's version after the update;
  determining whether or not the data categorized into the specified item in the mapping information corresponding to the software's version before the update has a preset default value, when the data storage position of the data categorized into the specified item in the mapping information corresponding to the software's version before the update is determined not to exist in the mapping information corresponding to the software's version after the update;
  recognizing the specified item as information to be backed up, when the data categorized into the specified item in the mapping information corresponding to the software's version before the update is determined not to have the preset default value; and
  updating the software, when the data categorized into the specified item in the mapping information corresponding to the software's version before the update is determined to have the preset default value,
 wherein the data categorized into the specified item in the mapping information corresponding to the software's version before the update is determined to have the preset default value, when no registered content exists regarding the specified item, and
 wherein the specified item includes a destination table, and in a case where the specified item is the destination table, the data categorized into the specified item in the mapping information corresponding to the software's version before the update is determined to have the preset default value when the destination table has no mail address as the registered content.

6. The system according to claim 5, wherein the program code further implements the act of displaying, on the information processing apparatus, the recognized information.

7. The system according to claim 5, wherein the recognized information is allowed to be manually backed up and the software is allowed to be manually updated by a user.

8. The system according to claim 5, wherein the preset default value is basic format data for the specified item.

9. An information processing method executed in an information processing apparatus which updates software, the method comprising:
 storing a list in a storage medium, wherein the list associates a version of the software before an update and a version of the software after the update with mapping information representing a plurality of data storage positions of respective data categorized into an item of a plurality of items, and wherein the data storage position indicates a position in the information processing apparatus;
 determining, by referring to the stored list, whether or not the data storage position of the data categorized into a specified item in the mapping information corresponding to the software's version before the update exists in the mapping information corresponds to the software's version after the update;
 determining whether or not the data categorized into the specified item in the mapping information corresponding to the software's version before the update has a preset default value, when the data storage position of the data categorized into the specified item in the mapping information corresponding to the software's version before the update is determined to exist in the mapping information corresponding to the software's version after the update;
 recognizing the specified item as information to be backed up, when the data categorized into the specified item in the mapping information corresponding to the software's version before the update is determined not to have the preset default value; and
 updating the software, when the data categorized into the specified item in the mapping information corresponding to the software's version before the update is determined to have the preset default value,
 wherein the data categorized into the specified item in the mapping information corresponding to the software's version before the update is determined to have the preset default value, when no registered content exists regarding the specified item, and
 wherein the specified item includes a destination table, and in a case where the specified item is the destination table, the data categorized into the specified item in the mapping information corresponding to the software's version before the update is determined to have the preset default value when the destination table has no mail address as the registered content.

10. The method according to claim 9, further comprising displaying the recognized information on the information processing apparatus.

11. The method according to claim 9, further comprising allowing the recognized information to be manually backed up and allowing the software to be manually updated by a user.

12. The method according to claim 9, wherein the preset default value is basic format data for the specified item.

13. A non-transitory computer-readable storage medium storing a computer-executable program for updating software, the computer-executable program causing a computer to perform a method comprising:
 storing a list in a storage medium, wherein the list associates a version of the software before an update and a version of the software after the update with mapping information representing a plurality of data storage positions of respective data categorized into an item of a plurality of items, and wherein the data storage position indicates a position in an information processing apparatus;

determining, by referring to the stored list, whether or not the data storage position of the data categorized into a specified item in the mapping information corresponding to the software's version before the update exists in the mapping information corresponds to the software's version after the update;

determining whether or not the data categorized into the specified item in the mapping information corresponding to the software's version before the update has a preset default value, when the data storage position of the data categorized into the specified item in the mapping information corresponding to the software's version before the update is determined to exist in the mapping information corresponding to the software's version after the update;

recognizing the specified item as information to be backed up, when the data categorized into the specified item in the mapping information corresponding to the software's version before the update is determined not to have the preset default value; and updating the software, when the data categorized into the specified item in the mapping information corresponding to the software's version before the update is determined to have the preset default value, wherein the data categorized into the specified item in the mapping information corresponding to the software's version before the update is determined to have the preset default value, when no registered content exists regarding the specified item, and wherein the specified item includes a destination table, and in a case where the specified item is the destination table, the data categorized into the specified item in the mapping information corresponding to the software's version before the update is determined to have the preset default value when the destination table has no mail address as the registered content.

* * * * *